(12) United States Patent
Fisenko et al.

(10) Patent No.: US 9,739,508 B2
(45) Date of Patent: Aug. 22, 2017

(54) APPARATUS AND METHOD FOR UTILIZING THERMAL ENERGY

(75) Inventors: Vladimir V. Fisenko, New York, NY (US); Robert Kremer, New York, NY (US)

(73) Assignee: HUDSON FISONIC CORPORATION, New York, NY (US)

( * ) Notice: Subject to any disclaimer, the term of this patent is extended or adjusted under 35 U.S.C. 154(b) by 747 days.

(21) Appl. No.: 13/191,550

(22) Filed: Jul. 27, 2011

(65) Prior Publication Data

US 2012/0186672 A1     Jul. 26, 2012

Related U.S. Application Data

(60) Provisional application No. 61/369,110, filed on Jul. 30, 2010.

(51) Int. Cl.
| | |
|---|---|
| *F24J 3/00* | (2006.01) |
| *F28F 13/06* | (2006.01) |
| *B01F 5/04* | (2006.01) |
| *F01K 25/00* | (2006.01) |
| *F24J 3/08* | (2006.01) |

(52) U.S. Cl.
CPC ............. *F24J 3/006* (2013.01); *B01F 5/0416* (2013.01); *B01F 5/0423* (2013.01); *B01F 5/0428* (2013.01); *F01K 25/00* (2013.01); *F28F 13/06* (2013.01); *F24J 3/083* (2013.01); *Y02E 10/125* (2013.01); *Y10T 137/85978* (2015.04)

(58) Field of Classification Search
CPC ....................................................... F02B 3/06
See application file for complete search history.

(56) References Cited

U.S. PATENT DOCUMENTS

| | | | |
|---|---|---|---|
| 1,026,399 | A | 5/1912 | Koerting |
| 1,111,541 | A | 9/1914 | Koerting |
| 2,675,358 | A | 4/1954 | Fenley, Jr. |
| 3,045,481 | A | 7/1962 | Bunt et al. |

(Continued)

FOREIGN PATENT DOCUMENTS

| | | |
|---|---|---|
| CA | 451981 | 7/1946 |
| CN | 1239194 | 12/1999 |

(Continued)

OTHER PUBLICATIONS

Oliker, Ishai "Use of Fisonic Devices in Con Edison Service Territory", Jan. 2009, New York State Energy Research and Development Authority. Retrieved from www.nyserda.ny.gov/-/media/Files/Publications/Research/Other-Technical-Reports/demonstration-fisonic-devices.pdf on Nov. 18, 2014.*

(Continued)

*Primary Examiner* — Avinash Savani
*Assistant Examiner* — Deepak Deean
(74) *Attorney, Agent, or Firm* — Cantor Colburn LLP

(57) ABSTRACT

An apparatus is provided having a heat generation device such as a boiler. A hypersonic energy harvester is provided having a first input and a second input. The first input and the second input are fluidly coupled to the heat generation device. A variable speed pump is fluidly coupled to supply liquid from the heat generation device to the hypersonic energy harvester. A deaerator is fluidly coupled to receive condensate from the hypersonic energy harvester.

12 Claims, 20 Drawing Sheets

(56) References Cited

U.S. PATENT DOCUMENTS

| | | | |
|---|---|---|---|
| 3,064,878 A * | 11/1962 | Bayles et al. | 417/54 |
| 3,074,697 A | 1/1963 | Friedell | |
| 3,200,764 A | 8/1965 | Saunders | |
| 3,677,503 A | 7/1972 | Freeman, Jr. | |
| 3,774,846 A | 11/1973 | Schurig et al. | |
| 3,934,799 A | 1/1976 | Hull | |
| 4,379,679 A * | 4/1983 | Guile | 417/54 |
| 4,634,559 A | 1/1987 | Eckert | |
| 4,765,148 A | 8/1988 | Ohashi | |
| 5,037,585 A | 8/1991 | Alix et al. | |
| 5,205,648 A | 4/1993 | Fissenko | |
| 5,275,486 A | 1/1994 | Fissenko | |
| 5,338,113 A | 8/1994 | Fissenko | |
| 5,544,961 A | 8/1996 | Fuks et al. | |
| 5,931,643 A | 8/1999 | Skaggs | |
| 6,427,724 B2 | 8/2002 | Hua | |
| 6,523,991 B1 * | 2/2003 | Maklad | 366/163.2 |
| 8,193,395 B2 * | 6/2012 | Fenton | B01F 3/1214 568/840 |
| 8,419,378 B2 * | 4/2013 | Fenton | F04F 5/14 417/187 |
| 2004/0141410 A1 * | 7/2004 | Fenton et al. | 366/163.2 |
| 2008/0054645 A1 | 3/2008 | Kulkarni et al. | |
| 2012/0186672 A1 | 7/2012 | Fisenko et al. | |
| 2012/0248213 A1 * | 10/2012 | Kremer et al. | 237/13 |
| 2013/0264829 A1 | 10/2013 | Jordan, Sr. | |
| 2013/0305699 A1 | 11/2013 | Brissett | |

FOREIGN PATENT DOCUMENTS

| | | |
|---|---|---|
| RU | 2045715 | 10/1995 |
| RU | 2061195 | 5/1996 |
| RU | 2114326 | 6/1998 |
| RU | 2115027 | 7/1998 |
| RU | 2127832 | 3/1999 |
| RU | 2132517 | 6/1999 |
| RU | 2142604 | 12/1999 |
| RU | 2221935 | 1/2004 |
| RU | 2263826 | 11/2005 |
| TW | 200631910 A | 9/2006 |
| WO | 9856495 | 12/1998 |

OTHER PUBLICATIONS

Fisenko, V. et al. Industrial Applications of Fisonic Devices, Jan. 2010, HFC Corp. http://www.fisonic.us/presentations/FISONIC_WHITE_PAPER.pdf retrieved Jun. 17, 2015.*

International Search Report mailed Feb. 27, 2012 for International Application PCT/US2011/045192; all ISR references cited herein.

Written Opinion mailed Feb. 27, 2012 for International Application PCT/US2011/045192; all ISR references cited herein.

http://www.alibaba.com/product-gs/418103756/KUHO_125_Variable_speed_of_sound.html.

International Search Report and Written Opinion for International Application No. PCT/U62015/038509 dated Sep. 6, 2015; Mailed Sep. 29, 2015; 10 pages.

* cited by examiner

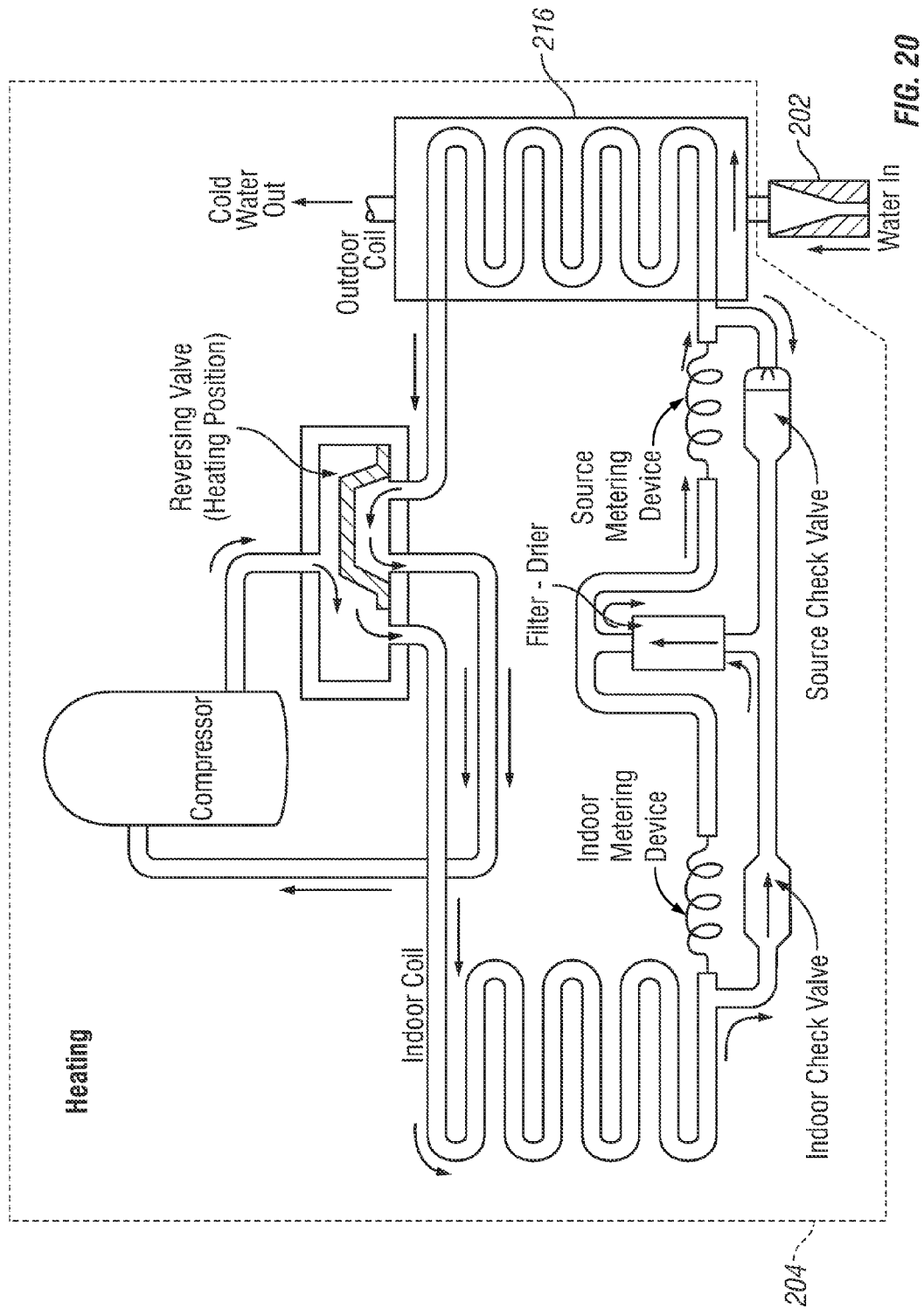

APPARATUS AND METHOD FOR UTILIZING THERMAL ENERGY

CROSS REFERENCE TO RELATED APPLICATIONS (IF APPLICABLE)

This application claims priority to U.S. Provisional Application Ser. No. 61/369,110 entitled "An Apparatus and Method for a Hypersonic Kinetic Energy Harvester, Mixer, Dozator, Homogenizer, Pasteurizer, Expander and Hyper Condensate Recycler" filed on Jul. 30, 2010 the contents of which are incorporated herein in their entirety.

BACKGROUND OF THE INVENTION

The invention relates to the field of thermal energy harvesting, mixing, vacuum and pumping technology, in which it is possible to organize the process of efficient thermal energy harvesting and create thrust and vacuum by utilizing the interparticle kinetic energy of the liquids in a closed or an open loop.

Known method of heating liquids, includes an electric or steam driven pump, an indirect and direct contact heat exchangers and jet apparatuses supplied with thermal energy from boilers or district energy systems, where liquids are heated by steam or hot water supply (See for example Reference 1). The heated water is transported to the consumers (end users). After transferring the heating energy to the user, the cooled liquid/condensate collected in condenser and is transported in a closed loop back to the heat source by the pump and the cycle repeats again. Make-up fluid is provided to the system when the fluid is not returned from the end user. This method consumes a substantial amount of thermal and pumping energy for heating and transportation of the liquid.

Many jet-type devices for heating and transporting liquids, steam, gases and solid materials are used in the industry. These jet-type devices include Venturi de-superheaters, steam ejectors, jet exhausters and compressors, jet eductors and jet vacuum pumps.

The typical jet-type device consists of three principal parts: a converging (working) nozzle surrounded by a suction chamber, mixing nozzle and a diffuser. The working (motive) and injected (entrained) streams enter into the mixing nozzle where the velocities are equalized by exchange of energy and the pressure of the mixture is increased. From the mixing nozzle the combined stream enters the diffuser where the pressure is further increased. The diffuser is so shaped that it gradually reduces the velocity and converts the energy to the discharge pressure with as little loss as possible. The jet-type device transforms the kinetic energy of the working stream to the injected stream by direct contact without consumption of mechanical energy. The jet-type devices operate with high expansion and moderate or high compression ratios and require a continuous motive force.

During the interaction of two streams with various velocities an increase in entropy of the mixed stream takes place (as compared with an invertible mixing), resulting in the reduction of the pressure of the discharged stream. Therefore, typically the discharge pressure of the jet-type device is higher than the pressure of the injected stream but lower than the pressure of the working stream.

The disadvantage of jet-type devices is that jet-type devices use high level kinetic motive force to perform work, which degrades the outlet pressures, drastically reduces the effectiveness of initial energy input ratios and requires a continuous motive force. Therefore these devices cannot be used to escalate pressure to a higher output level. Other devices, such as devices that operate based on what is known as Fisonic technology can utilize a lower energy input and escalate the initial thrust and thermal load. Fisonic technology design achieves this by exploiting the two-phase flow's very low Mach number and harvesting a minute amount (<0.1%) of the system's thermal energy and converting it to kinetic thrust.

In the Fisonic device ("FD") the injected water/fluid enters the mixing chamber with high velocity in parallel with the velocity of the working stream. The injected water/fluid is typically supplied through a narrow circumferential channel surrounding the working nozzle. The mixing chamber typically has a conical shape. The optimized internal geometry of the FD causes the working and the injected streams to mix and accelerate, creating transonic conditions, breaking the stream into tiny particles and changing the state of the mixing streams into plasma conditions, and finally converting the minute fractions of the streams thermal energy to physical trust (pump head) with the discharge pressure higher than the pressure of the mixing streams. The main reason behind this phenomenon is the high compressibility of homogeneous two-phase flows. It was demonstrated that uniform two-phase flows have more compressibility than the flows of pure gases. Hence the possibilities of the more effective conversion of thermal energy into the mechanical work in uniform two-phase mixtures especially in the transonic or supersonic modes.

The sonic speed in such systems is much lower than the sonic speed in liquids and in gas. As one can see from FIG. 1 the minimum sonic velocity takes place at the volumetric ratio of the streams of 0.5). The important feature of the FD is also the independence of the discharge flow from the changing parameters of the end user system downstream (such as back pressure), indicating that the FD creates supersonic flow and there is no downstream communication past the Mach barrier (or upstream either).

Referring to FIG. 1 it may be seen that when there is no liquid—the ratio equals one, if there is no gas—the ratio $\beta$ equals zero. When there is 50% liquid and 50% gas (two phase flow)—the ratio $\beta$ is equal 0.5 and the sonic velocity is much lower than in gases and liquids. The equation of sonic speed is as follows:

$$S^2 = \frac{kP}{\rho} \quad (1)$$

Where: k=isentropic exponent, equal to the ratio of specific heats; P=pressure; $\rho$=density of the medium. For determining the isentropic exponent, the following equation was developed:

$$\frac{k_g(k+1)-2k}{k_g-1} k\beta \left[1+\left(\frac{1}{\beta}-1\right)^2\right] - 2\left(\frac{1}{\beta}-1\right)\left(\frac{1}{\varepsilon}-1\right) \quad (2)$$

Where: $k_g$=isentropic exponent of gas in the mixture; $\varepsilon$=critical ratio of pressures.

As the result of exchange of motion impulses between the working and injected streams, the sonic velocity in the mixing chamber is reduced. The stream at the entrance to the mixing chamber (throat) has a velocity equal to or larger than the local sonic velocity. As the result of the stream deceleration the temperature and pressure at the exit of the mixing chamber increase. The pressure becomes higher than the saturation pressure at the saturation temperature of the mixture. At the specific design geometry, the discharge pressure can increase by few times higher than the pressure of the working media. The liquid phase in the mixing chamber has a foam type (plasma) structure with a very highly turbulized surface area, therefore the dimensions of the FD are very small when compared with conventional surface type heat exchangers. It should be indicated that the FD is a constant flow device.

Substantial differences in the above described process take place at small injection coefficients. The reduction of the flow rate of the injected water/fluids at the constant steam flow rate leads to the increase of the water temperature to the saturation temperature corresponding to the pressure in the mixing chamber and, because of the shortage of water for condensation of all steam, while the FD's heat exchange operation continues, its pumping performance is proportionally reduced. This mode determines the minimum injection coefficient. At this mode the operational and geometry factors influence the characteristics of the FD. With the increase of the injection coefficient, when the flow rate of the injected water (as the result of the reduction of back pressure) is increased, the water temperature in the mixing chamber is reduced. At the same time because of velocity increase in the mixing chamber the water pressure is reduced. The increase of the flow rate of injected water leads to the reduction of the pressure at the entrance into mixing chamber up to the saturated pressure corresponding to the temperature of the heated water. Reduction of the backpressure doesn't cause the increase of the water flow rate because further pressure drop in the mixing chamber is impossible. This pressure drop which determines the flow rate of the injected water can't be increased. Further reduction of backpressure at this conditions leads to flashing of the water at the mixing chamber.

The cavitation of water in the mixing chamber determines the maximum (limiting) injection coefficient. It should be noted that this operational condition is the working mode of the FD. The FD operates with high expansion and small compression ratios.

Recent analysis and testing of FD's resulted in a conclusion that conversion of the internal (interparticle) energy of overheated liquid into the work can be achieved both with the presence of a "cold" heat-transfer agent and without it. Furthermore, under specific pressure values at the entrance into the apparatus and specific internal geometric parameters, the "cold" liquid itself becomes the two-phase medium before the pressure jump. From this phenomenon follows a principally important conclusion that under the desired conditions the internal (interparticle kinetic) energy of liquid could be transformed into useful work.

While existing systems described above are suitable for their intended purposes, improvements remain in the harvesting of thermal energy of the liquid while improving the efficiency of heat harvesting and providing reliable and stable operation of the system in a wide range of operating parameters.

BRIEF DESCRIPTION OF THE INVENTION

According to one aspect of the invention an apparatus is provided. The apparatus includes one or more heat generation devices. A first device is provided having multiple inputs, the multiple inputs includes a first input and a second input being fluidly coupled to the heat generation devices. A variable speed first pump is fluidly coupled to supply fluids from the heat generation devices to the first device. A deaerator is fluidly coupled to receive the fluids from the first device.

According to another aspect of the invention a method of operation of an apparatus is provided. The method includes feeding at least one liquid heat carrier under pressure into a nozzle. A cold liquid heat carrier is then fed in and mixing the liquid heat carrier and the cold liquid heat carrier. Wherein one of two conversions are carried out with the liquid flow of the liquid heat carrier mixture. The first conversion includes an acceleration of the heat carrier mixture to a velocity at which the heat carrier mixture or at least one of the heat carriers of the mixture boils with the formation of a two-phase flow with the transfer of the latter to conditions with a Mach number of more than 1, and then a change of pressure with the transfer in the latter of the two-phase flow to a subsonic liquid flow of the heat carrier mixture and heating the liquid flow of the heat carrier mixture during the change of pressure. The second conversion includes an acceleration of the liquid flow of the heat carrier mixture to a velocity at which the heat carrier mixture or at least one of the heat carriers of the mixture boils with the formation of the two-phase flow with the transfer of the latter to the conditions with a Mach number equal to 1, then the two-phase flow being decelerated, and thereby the flow being converted into the liquid flow of the heat carrier mixture with vapor-gas bubbles, and additionally, by this flow conversion, the liquid flow of the heat carrier mixture being heated; thereafter carrying out the two above-mentioned conversions of the liquid flow of the heat carrier mixture in any sequence, the heated liquid flow of the heat carrier mixture being fed under the pressure obtained in a jet apparatus to a consumer.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

Figure 1:
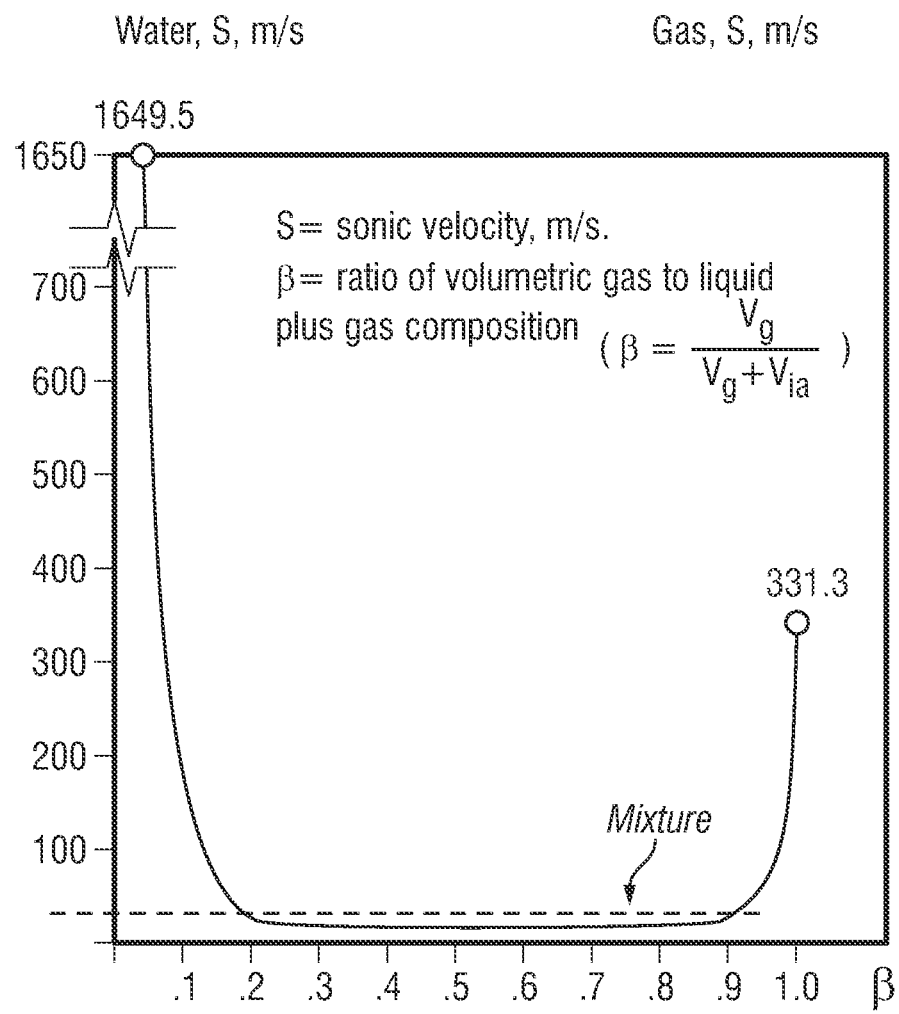
FIG. 1 is a graph illustrating the relationship between the sonic velocity and the ratio of volumetric gas to liquid.

The detailed description explains embodiments of the invention, together with advantages and features, by way of example with reference to the drawings.

DETAILED DESCRIPTION OF THE INVENTION

Embodiments of the present invention provide for a hypersonic kinetic energy harvester, heat exchanger, mixer, dozator, homogenizer, pasteurizer, de-superheater, pump, flow/energy meter, emulsifier, thruster, expander and hyper condensate recycler (collectively referred to as "FD device"). Embodiments of the present invention create conditions for thermal energy harvesting and substantial reduction of the thermal and pumping energy consumption by utilizing of the FD device. Embodiments of the invention provide for a FD device that converts the kinetic energy of the working fluid, supplied by the variable speed pump, into thermal and pumping energy, and provide reliable, stable and cavitation free operation of the system. This provides advantages in substantially reducing the energy consumption of the existing pump and the conventional thermal energy supply. Embodiments of the invention may also be equipped with a deaerator which thoroughly removes from the liquid the non-device. The FD device condensible gases and substantially improves the thermal energy harvesting in the FD may also operate without any external pump, as long as the fluids are present in the reactant mixing chamber and there is a thermal delta or a delta-p. The FD device will start operating and will pump the fluids.

The performance of embodiments of the FD device are based on properties of two-phase flows, first of all of their increased compressibility. In order to improve the effectiveness and thermal energy harvesting rate of the FD device, the cold liquid is initially preheated in a boiler, by district energy, solar, geothermal, wind, biomass, fossil, nuclear, waste or chemical energy, and is pumped (at the startup of the device) into the FD device. In the FD device the single phase liquid flow at subsonic conditions is transformed into a homogeneous two-phase flow (plasma) which is transferred into a supersonic flow containing multiple microscopic vapor bubbles; then the simultaneous collapse of the vapor babbles in the supersonic two-phase flow takes place with resulting conversion of the two-phase flow into single phase flow, providing additional thermal energy and some pumping power. The capability and versatility of FD device is such that depending upon end user requirements the FD device's capability can be configured to meet specific applications.

Embodiments of the FD device consist of a diffuser equipped with geometry directing ribs. The diffuser is connected to a ring equipped with multiple tubes having helical ribs on inside surface. The ribs generate a swirl flow resulting in a centrifugal action that provides effective turbulization of the liquid. Afterwards, the liquid enters in an open chamber. At this chamber the original liquid stream injects an additional liquid stream recirculating in the concentric external pipe from the discharge section of the FD device. The mixed flow further discharges into the coaxial nozzle located at the entrance of the Laval nozzle. After the Laval nozzle the liquid pressure is reduced to a value not higher than the saturation vapor pressure corresponding to the liquid temperature. At these conditions multiple vapor bubbles are formed in the liquid. The length of the Laval nozzle is a predetermined length.

At a predetermined distance from the Laval nozzle the liquid enters a geometry nozzle after which a counter pressure is applied causing emergence of a pressure surge with avalanche collapsing therein of the vapor component of the two-phase flow. In the course of the pressure surge, a range of oscillations is generated fostering collapsing of newly formed small vapor bubbles, which in their turn generate thermal energy and increase in the temperature of the liquid and a thrust of the liquid. At this point, part of the liquid is separated from the main stream and re-circulated back to the mixing chamber at the entrance of the FD device.

The main liquid stream moves a predetermined distance and afterwards enters into a geometry ring/screen where additional thermal energy is harvested. Afterwards the liquid enters the conical discharge section from which the liquid with increased temperature is discharged in the piping system. The recirculation of a partial stream inside of the FD device allows providing reliable stable operational modes of the system in a wide range of system parameters (flow rates, temperatures and pressures).

The heated liquid is transported to the heat users. From the users the cooled liquid stream may recirculate back to the boiler or other heat input source. The return liquid can also pass through a deaerator in which the liquid is deeply deaerated. The removal of the non-condensable gases in the deaerator improves the energy harvesting process. In the repeated recirculation cycles the major heat input and pumping power are provided by the FD device and the heat input of the boiler and the pumping power of the pump are substantially reduced. When the liquid is not returned from the customer, make-up liquid is provided to the FD device.

The dependence of the jump pressure, $P_2$, from the pressure before the jump inside of the device (PO is described by the following equation:

$$P_2 = k P_{bj} M^2 \qquad (3)$$

In the transonic or over sonic flow the homogeneous two-phase stream is achieved by the reduction of the sonic velocity which permits to achieve the Max Number equal or higher than one ($M \geq 1$) at low stream velocities.

The work balance of the FD device is described by the following equation:

$$\frac{k}{k-1} P_w V_w \left[ \left( \frac{P_w}{P_i} \right)^{\frac{k-1}{k}} - 1 \right] = (P_d - P_i) V_w (u+1) \qquad (4)$$

Where:

$$k = \frac{C_p}{C_v};$$

$C_p$=specific heat at constant pressure; $C_v$=specific heat at constant volume; w, i, d—Subscript denoting the following parameters of the working, injected and discharge streams: P=pressure and V=specific volume; u=injection coefficient equal to the ratio of injected and working flow rates.

The specific characteristics of the FD device are closely related to the geometry of the mixing chamber. The discharge pressure ($P_d$) after the FD device is presented by the following equation:

$$P_d = P_w \left[ T_{w1} \frac{f_{w1}}{f_3} + \frac{K_1}{\varphi_3} k_w T_{wc} \lambda_{w1} \frac{f_{wc}}{f_3} - (1 - 0.5\varphi_3^2) k_w \left( \frac{2}{k_w + 1} \right)^{k_w + 1/k_w - 1} \frac{V_d}{V_w} \left( \frac{f_{wc}}{f_3} \right)^2 (1+u)^2 \right] + \left( 1 - \frac{f_{wc}}{f_3} \right) P_i \qquad (5)$$

Where: $T_{w1} = P_i/P_w$; $f_{w1}$=cross section of the working nozzle exhaust; $f_3$=cross section of the mixing chamber exhaust; $K_1$=working stream velocity coefficient; $\varphi_3$=diffuser stream velocity coefficient; $T_{wc} = P_c/P_w$=ratio of pressure in the critical section of the working nozzle to the working pressure; $\lambda_{w1}$=ratio of the velocity of working stream at adiabatic flow to the critical velocity; $f_{wc}$=cross section of critical section of the working nozzle; u=injection coefficient.

The relationship between the pressure at the entrance in the mixing chamber ($P_2$) and the injection coefficient is determined from the following equation:

$$\frac{P_2}{P_w} = \frac{P_i}{P_w} - \frac{k_w}{2}\left(\frac{2}{k_w+1}\right)^{k_w+1/k_w-1}\left(\frac{f_{p^*}}{f_2}\right)^2 \frac{v_i}{v_w}(1+u)^2 \qquad (6)$$

The equation of energy conservation for the medium with any compressibility is:

$$dq=(^K/k-1)P\,du+1/(k-1)\cdot u\cdot dP+dq_{mp} \qquad (7)$$

For an incompressible fluid (k→∞, dv=0), that moves in the adiabatic channel, the only heat source is friction. An incompressible fluid cannot serve as working medium for the conversion of thermal energy into the mechanical work. The situation is different when the equation (7) is applied to the cross section of the flow at the border of the pressure jump, where on one side the highly compressible two-phase mixture of fog-like structure is located, and on other side of the section of the pressure jump a single-phase liquid with the small bubbles of steam (gas) is located.

The conditions of the heat balance in the pressure jump mode are:

$$\rho_{1d}(1-\beta)*\Delta q=\rho_g*\beta*r \qquad (8)$$

$$\Delta q=(\rho_g/\rho_{1g})*r*(M^2-1) \qquad (9)$$

Where: r=the latent heat of phase change. From the analysis of equation (9) the several conclusions may be made. First, At M<1, $\Delta q$<0—is the well-known process of evaporative cooling of liquid. Second, At M=1, $\Delta q$=0—is the phenomenon of degeneration of turbulences described, respectively, in reference (3) for the internal problem of a gas moving with the near-critical speed close to the exit section of cylindrical channel, and in reference (4) for the exterior problem of the flow around cylinder of the near sonic flow of gas. For the uniform two-phase mixture the problem was addressed in reference (5). Finally, At M>1, $\Delta q$>0—is the phenomenon, which was addressed in reference 6 by U. Potapov under a certain internal geometric influence on the fluid flow.

Under the controlled geometric, thermal, expense or combined influence on the fluid flow the maximum possible release of thermal energy by the internal energy of liquid is described by the following equation:

$$\Delta q=(\Delta P/\rho_{1d})*(M^2/k-1) \qquad (10)$$

Where: $\Delta P$=differential between the pressure in the jump and the back pressure of system where the generated energy is supplied; and, $\rho_{1d}$=the density of liquid at the exit from the FD device.

Experiments have demonstrated that by changing the internal geometry of the FS device, temperature, pressure, chemical composition, adding sound waves, electric stimulation, configuration of piping, combination of gases and liquids and gravity forces, can change and enhance the device parameters and increase substantially the harvested thermal energy and pumping power.

Figure 2:
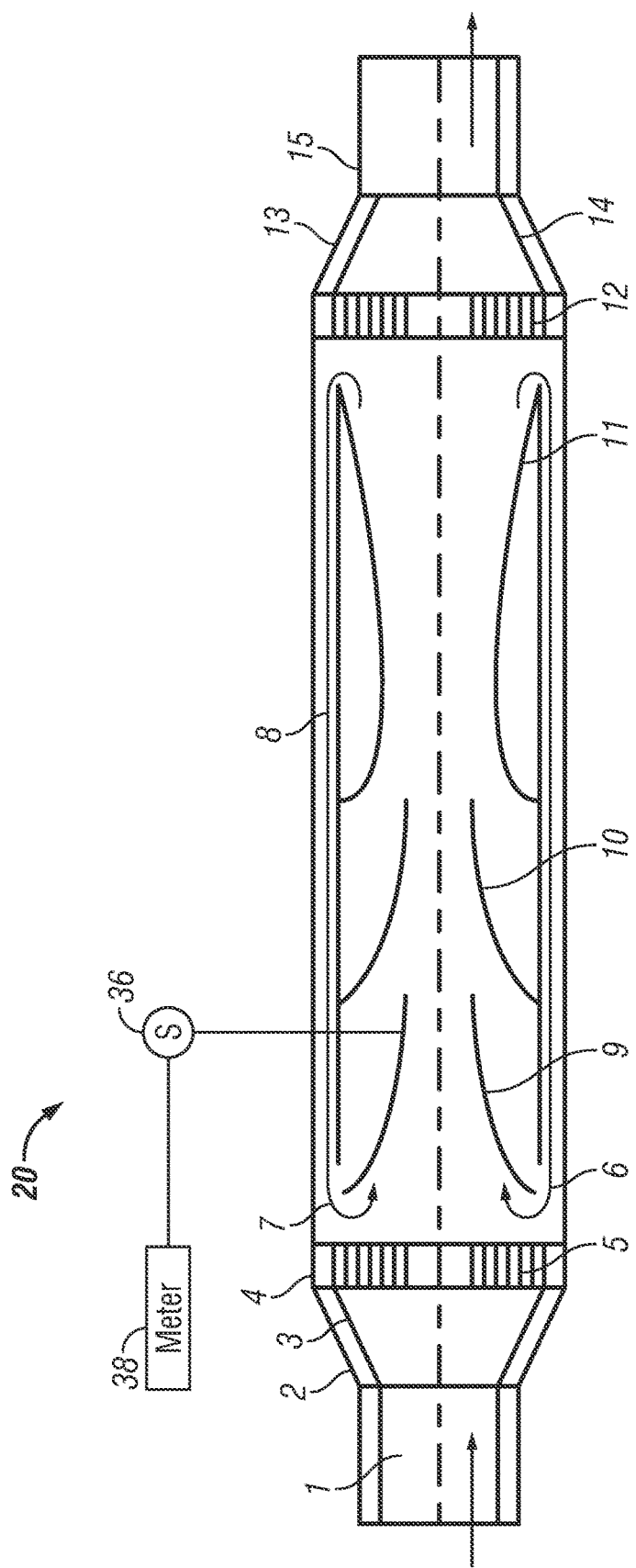
FIG. 2 is a schematic illustration of a Fisonic-type device in accordance with an embodiment of the invention.
Figure 3:
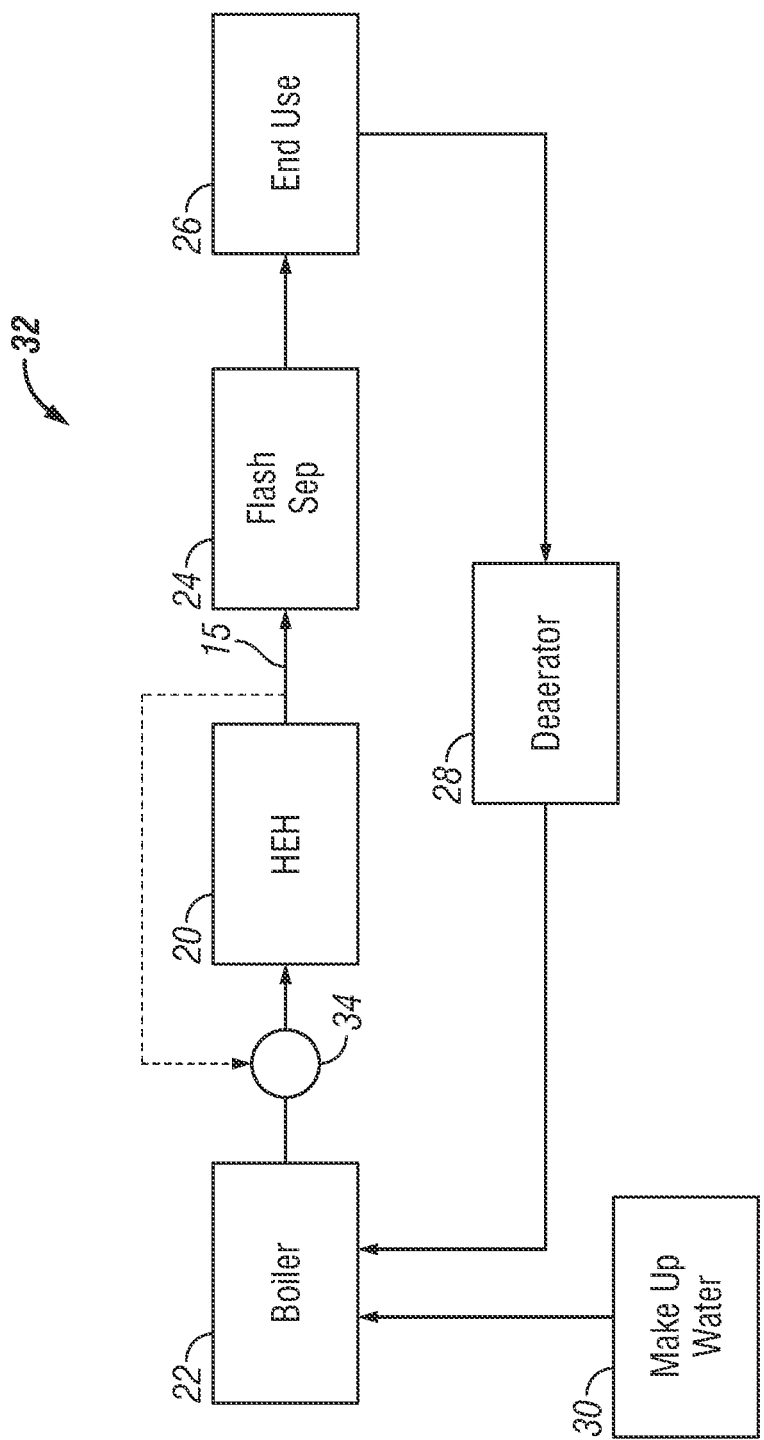
FIG. 3 is a schematic illustration of a system incorporating the device of FIG. 2.

One embodiment of the FD device 20 is illustrated in FIG. 2 and FIG. 3. A liquid 1 is pumped and initially preheated in a device 22, such as but not limited to a boiler, by district energy, solar, geothermal, wind, biomass, fossil, waste or chemical energy for example. It should be appreciated that while the embodiment described herein reference a linear construction of the FD device, the claimed invention should not be so limited. In some embodiments, the FD device is configured in the shape of a 360 degree ring torus for example. After heating, the liquid 1 is pumped (during start up) into FD device 20. The FD device 20 includes of a diffuser 2 equipped with geometry directing ribs 3. The diffuser is connected to a ring 4 equipped with multiple tubes 5 having helical ribs on an inside surface. The ribs being configured to generate a swirl flow resulting in a centrifugal action to provides turbulization of the liquid. Afterwards the liquid enters in an open chamber 6. The length of the mixing chamber may be changed depending on the end use application. In chamber 6, a portion of the original liquid stream 1 is injected as an additional liquid stream 7. The liquid stream 7 is re-circulated in the concentric external pipe 8 from the exit of nozzle 11 of the FD device 20.

The mixed flow is further discharging into a first Laval nozzle 9 that compresses the single phase liquid stream 7. In one embodiment, one or more pressure sensors 36 are coupled to the first Laval nozzle 9. The pressure sensors 36 are configured to provide a signal indicative of the pressure in the first Laval nozzle 9 to liquid flow metering device 38. The liquid stream 7 is discharged into a second Laval nozzle 10. At predetermined distance from the second Laval nozzle 10, the stream enters a nozzle 11. In one embodiment, the pressure of the single phase liquid flow after the Laval nozzle is reduced to a value not higher than the saturation vapor pressure corresponding to the liquid temperature. At these conditions multiple vapor bubbles are formed in the liquid. After the nozzle 11 a partial liquid stream is separated and re-circulated to the chamber 6 throughout the concentric pipe 8. It has been found that the recirculation of a partial stream inside of the FD device 20 allows providing reliable stable operational modes of the system in a wide range of system parameters (flow rates, temperatures and pressures).

In one embodiment, the nozzle 11 provides a braking effect on the two-phase flow and create counter pressure which causes emergence of a pressure surge with avalanche collapsing therein of the vapor component of the two-phase flow and conversion of two-phase flow into single phase flow. In the course of the pressure surge, a range of oscillations is generated fostering collapsing of microscopic vapor bubbles, which in their turn harvest thermal energy and increase in the temperature of the liquid and a thrust of the liquid.

The main liquid stream moves some predetermined distance and enters into a ring/screen 12. Afterwards the main liquid stream enters the conical discharge section 13 equipped with ribs 14, from which the liquid with increased temperature and thrust is discharged in the piping system 15. In one embodiment, the piping system includes a conduit that flows a portion of the discharge flow from the FD device 20 back to a pumping device 34. In the exemplary embodiment, the pumping device 34 is a hydro turbine pump or a jet pump.

It should be appreciated that the FD device 20 may include additional nozzles or inputs that provide for the supply of additional liquids and gases for mixing with the main liquid stream and creation of homogeneous mixtures and emulsions.

In one embodiment, the piping system 15 can be equipped with a flash separator 24 where the heated water is flashed, steam is separated and supplied to an end use application 26, such as a building steam heating system for example. The separator is connected to an FD device 20, which reduces the pressure in the separator and provides the water flashing conditions.

The heated liquid or steam is then transported to the end use application 26. Once the thermal energy is extracted from the heated liquid or steam at the end use application, the cooled liquid or condensate stream is re-circulated back to the boiler 22 or other heat input source. The return recirculation line may also be connected to a deaerator 28 where the liquid is deeply deaerated to provide removal of non-condensable gases, make-up and liquid expansion functions. In one embodiment, the deaerator is also used as an expansion device. In embodiments where cooled liquid is not returned from the end user application 26, make-up water 30 is supplied to the system 32. In the repeated recirculation cycles the heat input and pumping power provided by the FD device 20 and the heat input of the boiler substantially reduce the requirements of pumps 34 of the system 32.

In one embodiment the FD device utilizes interparticle forces (kinetic energy of one-two- and multiphase medium) and intended for mixing, temperature increase, and creation of thrust and vacuum of liquids and gases. The system can include a heat input device in the form of a boiler, district energy, solar, geothermal, wind, biomass, fossil, waste or chemical energy, a pump (for initial start up) that is connected to the FD device, which creates the conditions for energy harvesting and thrusts the heated liquid to a piping system connected to the consumer in open or closed loop circulation of the liquid medium and it may include a deaerator. The technical effect includes an FD device configured for specific range of operation. In one embodiment, the thermal energy harvesting temperature range should be between 110 C and 250 C. The FD device is applicable to various industries, transportation, irrigation, disinfection, fire extinguishing, water/oil separation, mixing, cooking, heating, cooling and low quality energy utilization.

Experiments have demonstrated that by changing the internal geometry of the FD device, temperature, pressure, chemical composition, adding sound waves, electric stimulation, configuration of piping, combination of gases and liquids and gravity forces, can change and enhance the device parameters and increase substantially the harvested thermal energy and pumping power.

Figure 4:
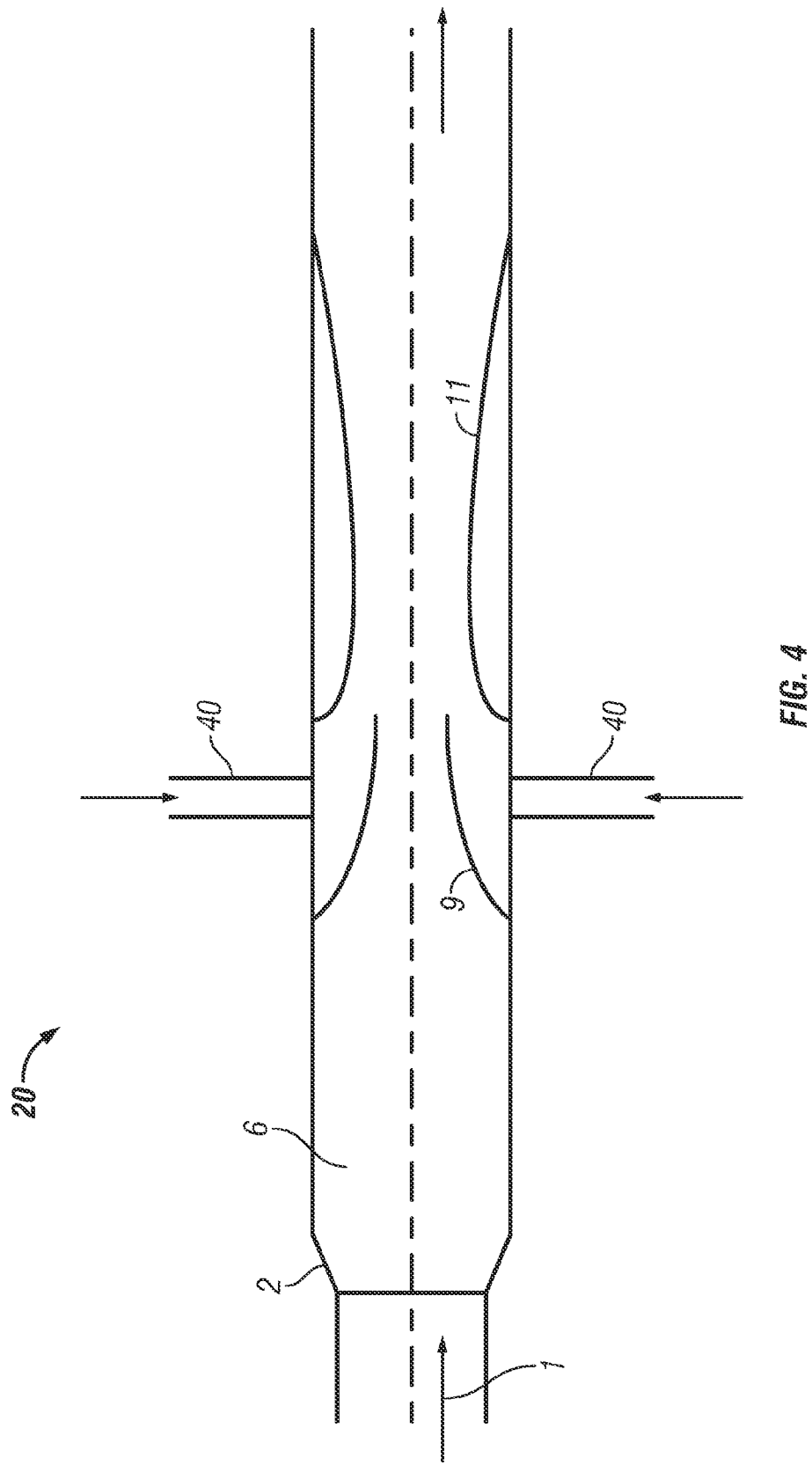
FIG. 4-FIG. 16 are schematic illustrations of other embodiments of Fisonic-type devices in accordance with other embodiments of the invention.

FIG. 4-FIG. 17 illustrate different embodiments of the FD device. The FD device 20 of FIG. 4 illustrates an embodiment wherein the FD device 20 performs as a two or multiphase thermo kinetic amplifier. In this embodiment, the FD device 20 has a single Laval nozzle 9 and braking nozzle 11. In the embodiment of FIG. 4, there is no concentric pipe to recirculate a portion of the fluid stream. Instead, a conduit 40 injects a fluid stream, such as a cold liquid heat carrier for example, between the entrance of Laval nozzle 9 and the entrance of nozzle 11.

Figure 5:
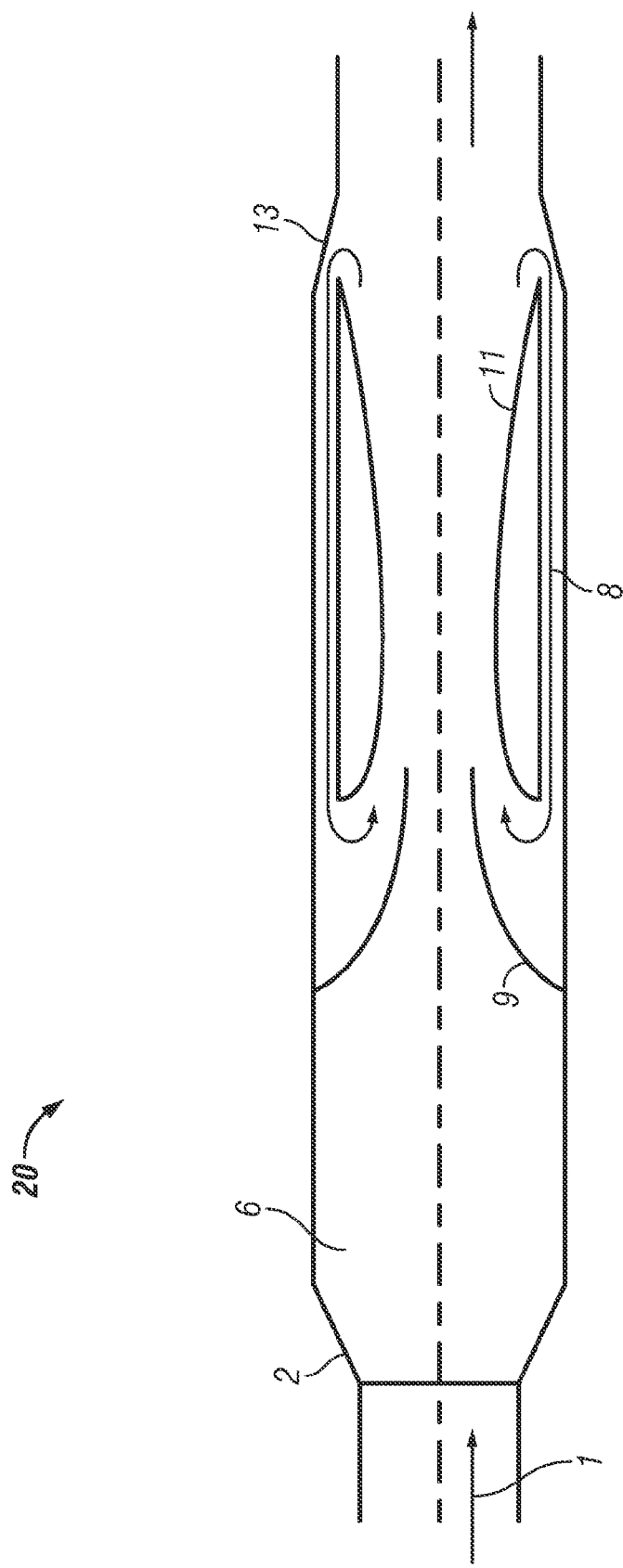

Referring now to FIG. 5, an embodiment is illustrated wherein the FD device 20 performs as a hypersonic kinetic amplifier. In this embodiment, a single Laval nozzle 9 is arranged downstream from the diffuser 2. The liquid exiting the Laval nozzle 9 is mixed with a recirculated liquid from concentric conduit 8 and enters a braking nozzle 11. Upon exiting the nozzle 11, a portion of the liquid stream recirculates via concentric conduit 11 while the remainder exits through conical discharge section 13.

Figure 6:
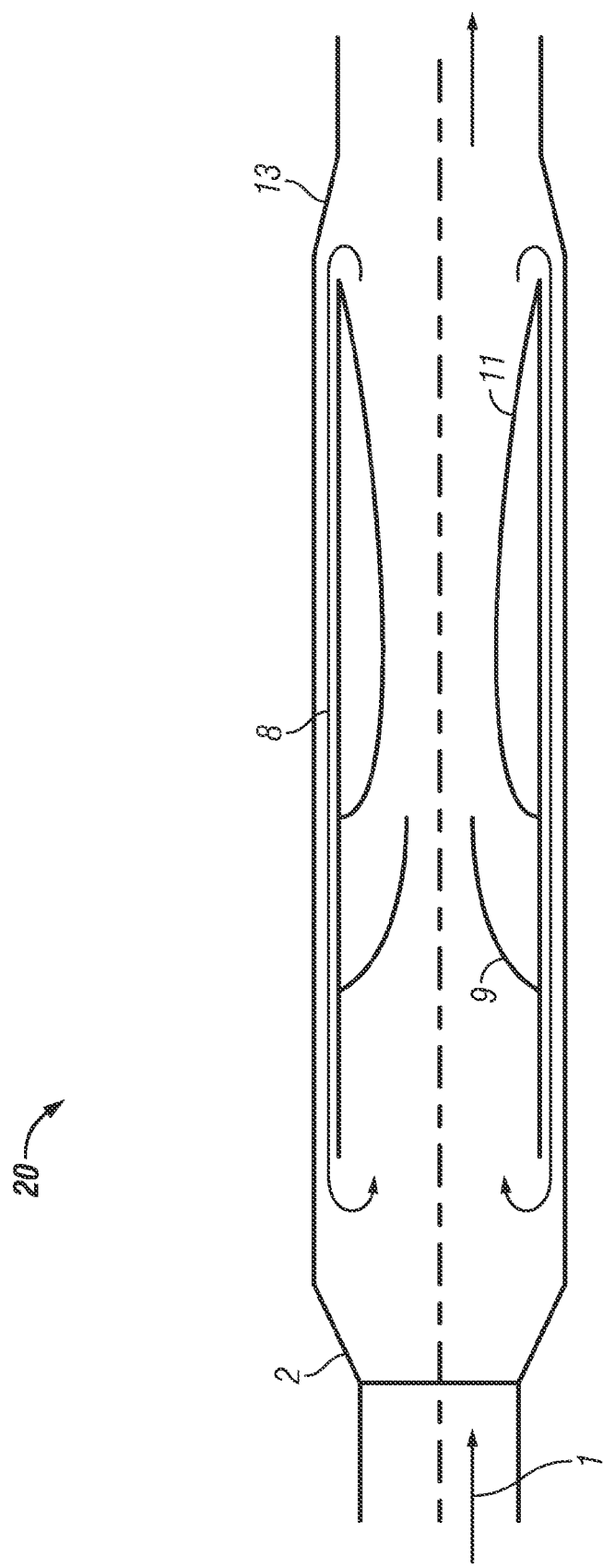

Referring now to FIG. 6, an embodiment is illustrated wherein the FD 20 performs as a multistage hyperkinetic amplifier. In this embodiment, the liquid stream 1 enters via the diffuser 2 into a chamber 6. A predetermined distance down stream from the diffuser 2, an exit of the concentric conduit 8 flows a recirculated liquid into the chamber 6 causing a mixing of the two fluid streams. The mixed stream then enters a single Laval nozzle 9 and a braking nozzle 11. The entrance to the concentric conduit 8 is arranged at the exit of the nozzle 11 causing a portion of the liquid stream to recirculate, while the remainder of the stream exits via the discharge section 13.

Figure 7:
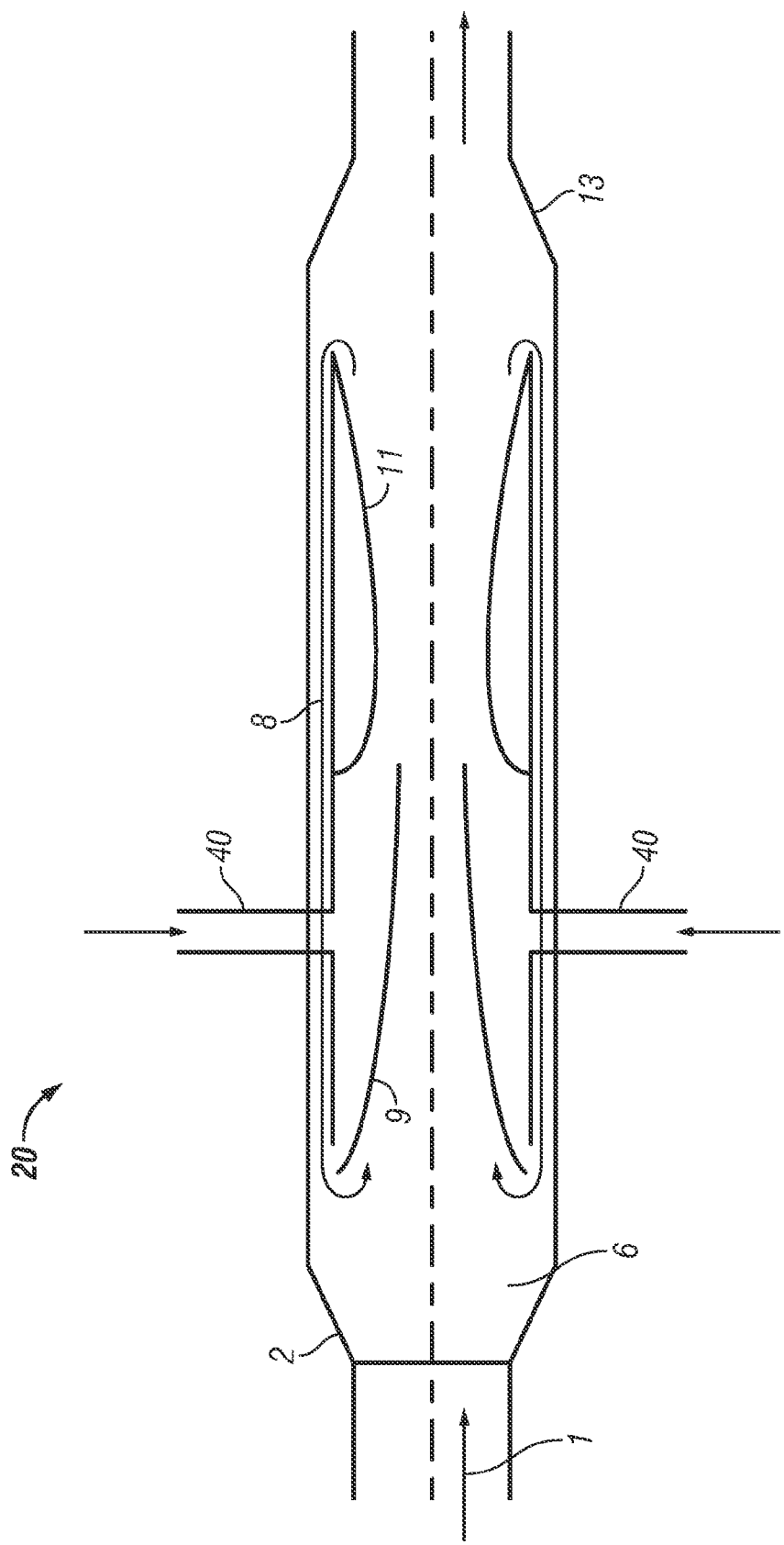

FIG. 7 illustrates an FD device 20 performing as a multiphase thermokinetic amplifier for mixing and multi-flow applications. The liquid stream 1 is received by the diffuser 2 and transferred into the chamber 6 where it is mixed with recirculated liquid from concentric conduit 8. The mixed liquid flows into a Laval nozzle 9. A second liquid stream is injected via a conduit 40. The second liquid is injected between the entrance and exit of the Laval nozzle 9. This combined liquid stream enters the braking nozzle 11. The entrance to the concentric conduit 8 is arranged at the exit of nozzle 11 to cause a recirculation of a portion of the fluid stream. The remainder of the mixed fluid stream exits via the discharge section 13.

Figure 8:
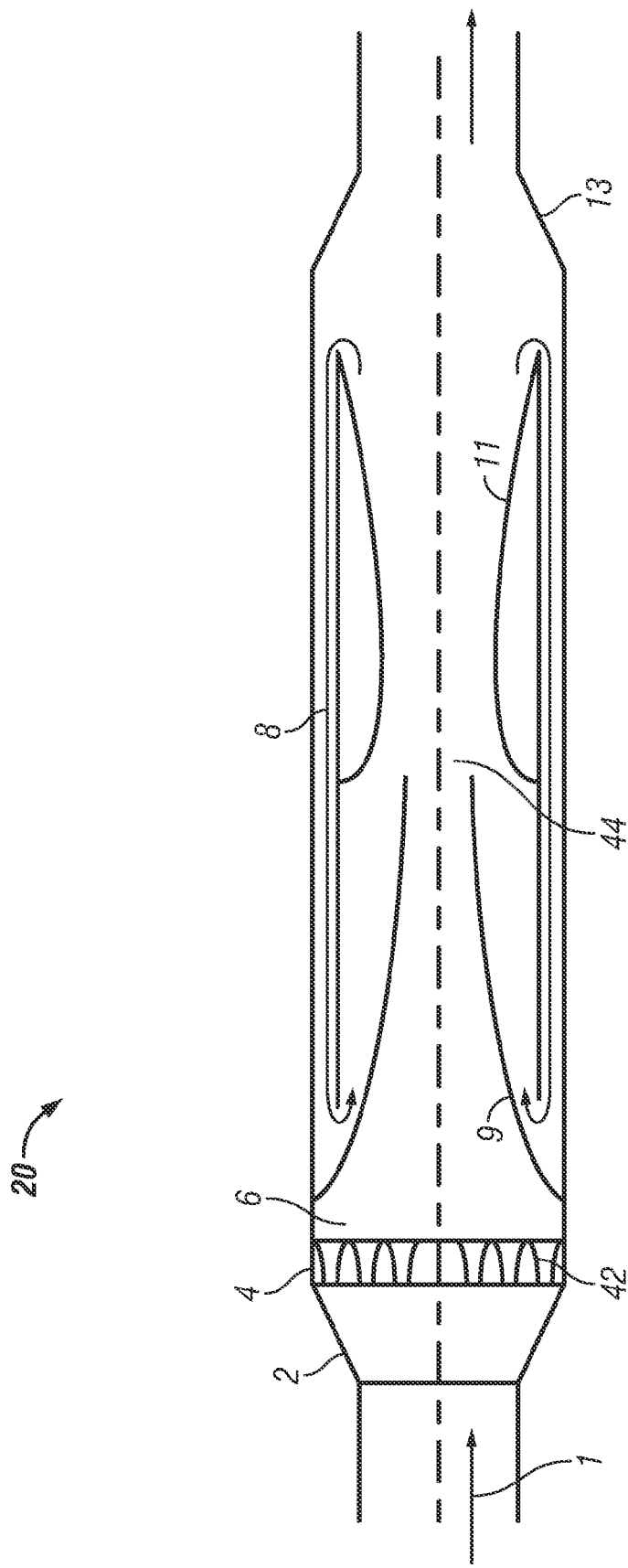

FIG. 8 illustrates an FD 20 performing as a hyper energy thruster. In this embodiment, the liquid 1 is received in the diffuser 2 and passes through a plurality of nozzles 42 into chamber 6. The liquid passes through Laval nozzle 9 and is combined with a recirculated liquid from concentric conduit 8. The concentric conduit injects the recirculated liquid external to the Laval nozzle 9 upstream from the exit 44. The liquid from the Laval nozzle 9 and the recirculated liquid are mixed at the entrance to the braking nozzle 11. In this embodiment the exit 44 and the entrance to nozzle 11 are substantially co-located. The entrance to the concentric conduit 8 is arranged at the exit of nozzle 11 to cause a recirculation of a portion of the fluid stream. The remainder of the mixed fluid stream exits via the discharge section 13.

Figure 9:
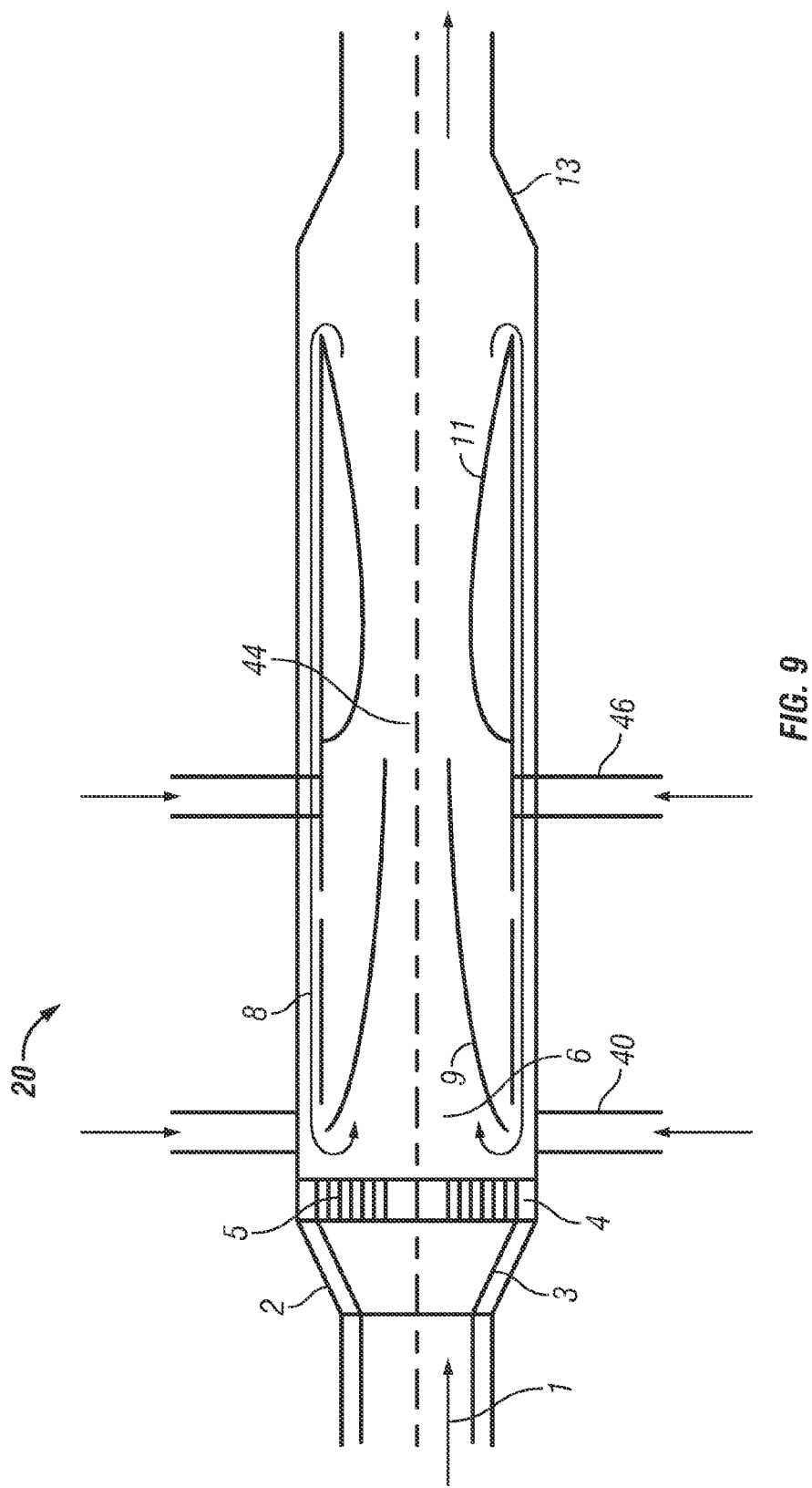

FIG. 9 illustrates an FD 20 performing as a multi-input energy harvester. In this embodiment, the liquid 1 passes through the diffuser 2 and is directed by ribs 3 into a ring 4 having multiple tubes 5. The liquid passes through the tubes 5 into chamber 6. A conduit' 40 injects a second liquid stream into the chamber 6 along with a recirculated liquid from concentric conduit 8. This combined liquid stream enters Laval nozzle 9. A third liquid stream is injected from a conduit 46 causing the liquid 1, the recirculated liquid, the second liquid stream and the third liquid stream to mix at the exit 44 and enter the braking nozzle 11. In this embodiment, the entrance to the nozzle 11 and the exit 44 are co-located. The entrance to the concentric conduit 8 is arranged at the exit of nozzle 11 to cause a recirculation of a portion of the fluid stream. The remainder of the mixed fluid stream exits via the discharge section 13.

Figure 10:
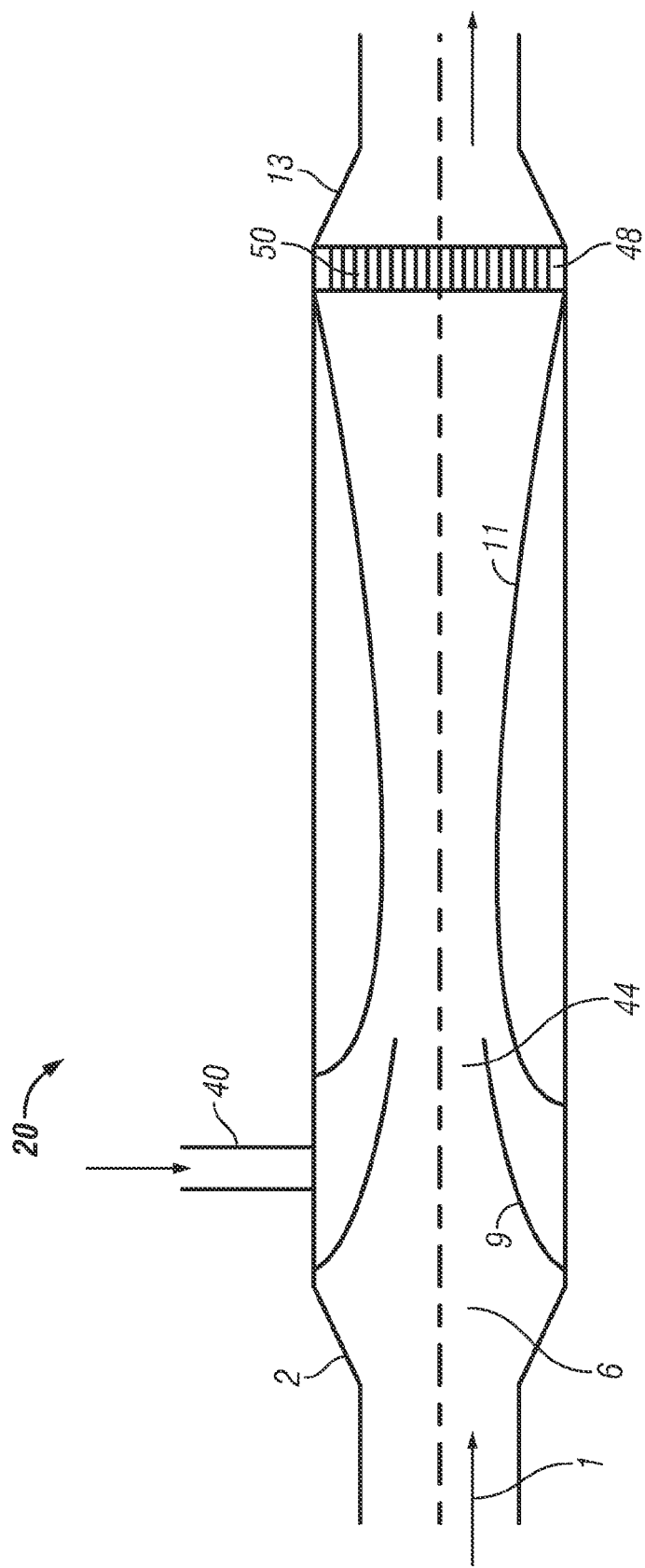

FIG. 10 illustrates an FD device 20 performing as a two-stage thermal energy harvester with an external feed. In this embodiment, the liquid 1 is received through the diffuser 2 into the chamber 6. The liquid then flows through Laval nozzle 9. An external feed conduit 40 injects a second fluid stream external to the Laval nozzle 9 upstream from the exit 44. The liquid 1 and the second fluid stream mix at the exit 44 and enter the braking nozzle 11. At the exit of the nozzle 11, a ring 48 having a plurality of tubes receives the liquid stream allowing the liquid stream to exit via the discharge section 13.

Figure 11:
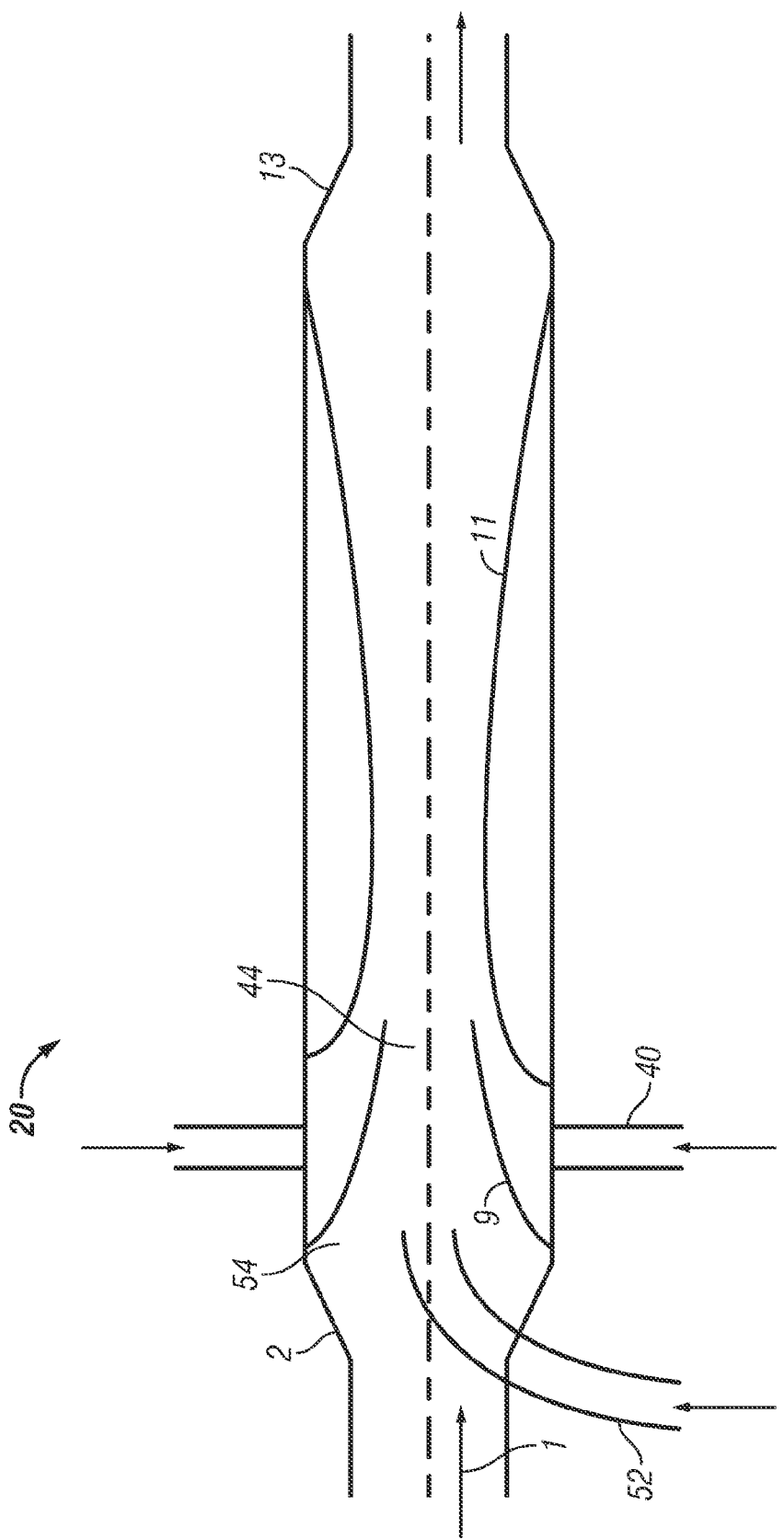

FIG. 11 illustrates an FD device 20 performing as a lower quality energy utilizer. In this embodiment, the liquid 1 is received via the diffuser 2 to the entrance 54 of a Laval nozzle 9. A second fluid stream is injected co-axially with the liquid 1 at the entrance 54. In this embodiment, the entrance 54 is substantially co-located with the exit of the diffuser 2. The combined fluid stream flows through the Laval nozzle 9 and into a braking nozzle 11. The entrance to the nozzle 11 is substantially co-located with the exit 44. The liquid stream exits the FD device 20 via the discharge section 13.

Figure 12:
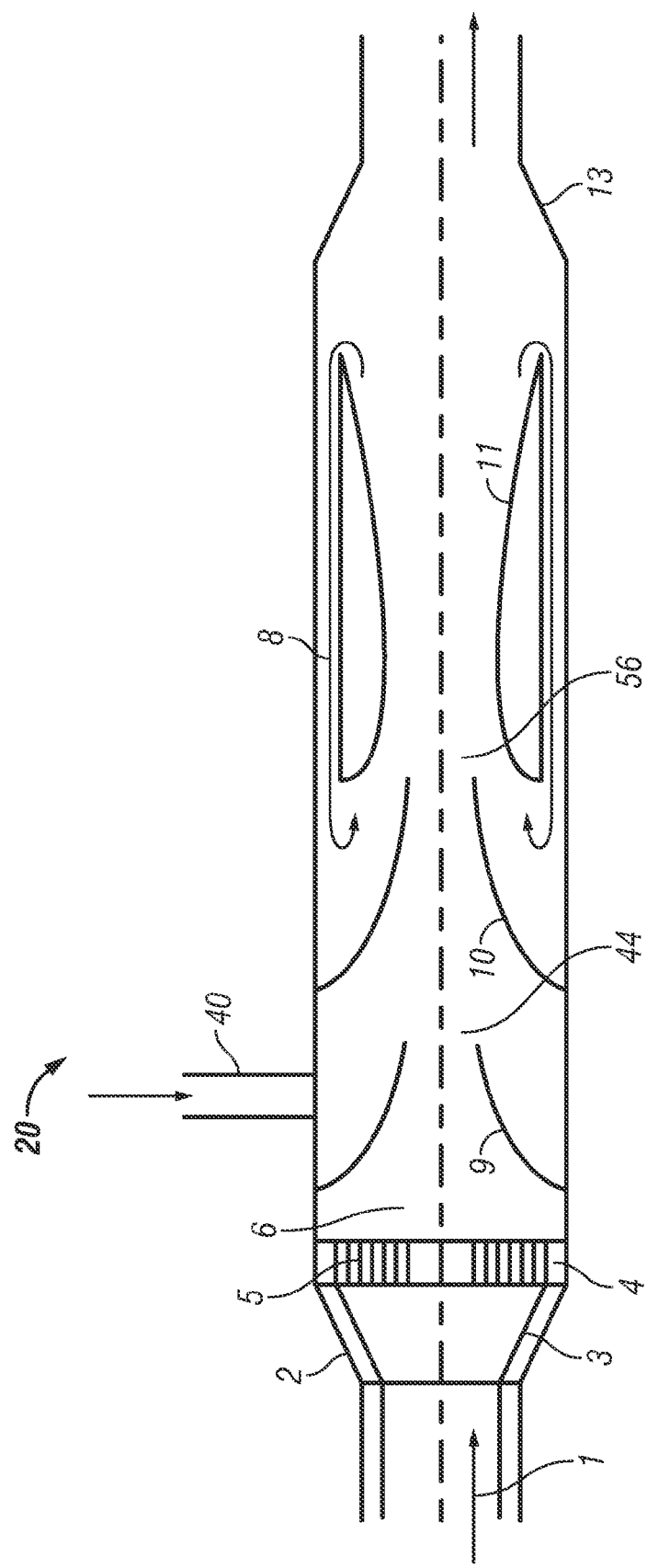

FIG. 12 illustrates an FD device 20 performing as a combined energy harvester and thruster. In this embodiment, the liquid 1 passes through the diffuser 2 and is directed by ribs 3 into a ring 4 having multiple tubes 5. The liquid passes through the tubes 5 into chamber 6. From chamber 6, the liquid flows into a first Laval nozzle 9. An second liquid stream is injected by an conduit 40 external to the first Laval nozzle 9. The liquid 1 from the first Laval nozzle 9 and the second liquid stream mix at the exit 44. A predetermined distance from the exit 44, a second Laval nozzle 10 receives the mixed liquid stream. The exit 56 of the second Laval nozzle 10 is arranged substantially co-located with an entrance to a braking nozzle 11. A concentric conduit 8 injects a recirculated liquid at the exit 56. The entrance to the concentric conduit 8 is arranged at the exit of nozzle 11 to cause a recirculation of a portion of the fluid stream. The remainder of the mixed fluid stream exits via the discharge section 13.

Figure 13:
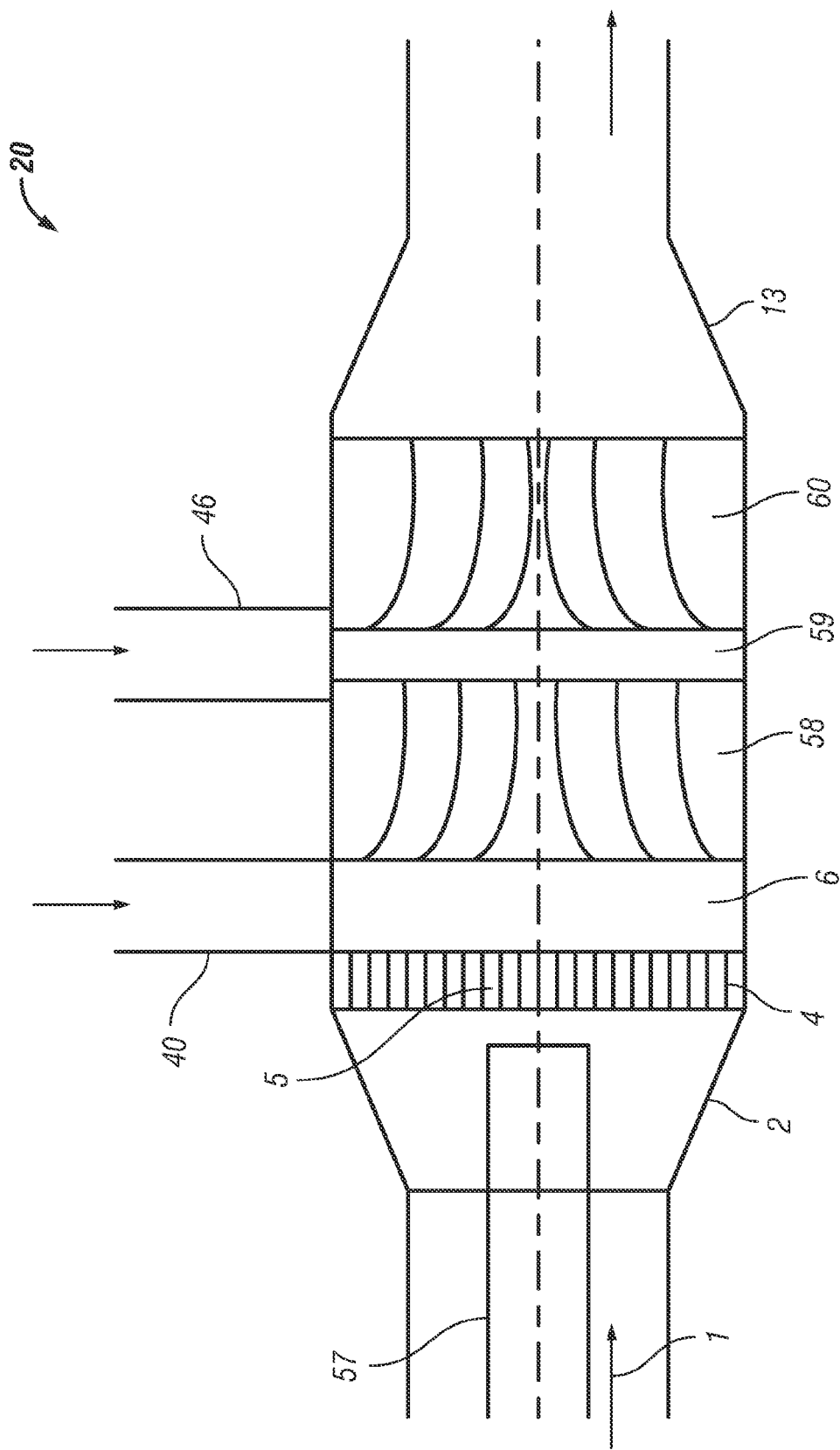

FIG. 13 illustrates the FD device 20 performing as a waste heat utilization scrubber. In this embodiment, the first liquid 1 is received via diffuser 2 and a second liquid is received from a coaxially arranged conduit 57. The two liquid streams are directed into a ring 4 having multiple tubes 5 into chamber 6. The two liquid streams are mixed with a first waste heat liquid stream from conduit 40 in chamber 6. The combined mixture is directed through a first set of vanes 58 into a second chamber 59 where the liquid stream is combined with a second waste heat liquid stream from conduit 46. This combination of fluids is directed through a second set of vanes 60 to a discharge section 13.

Figure 14:
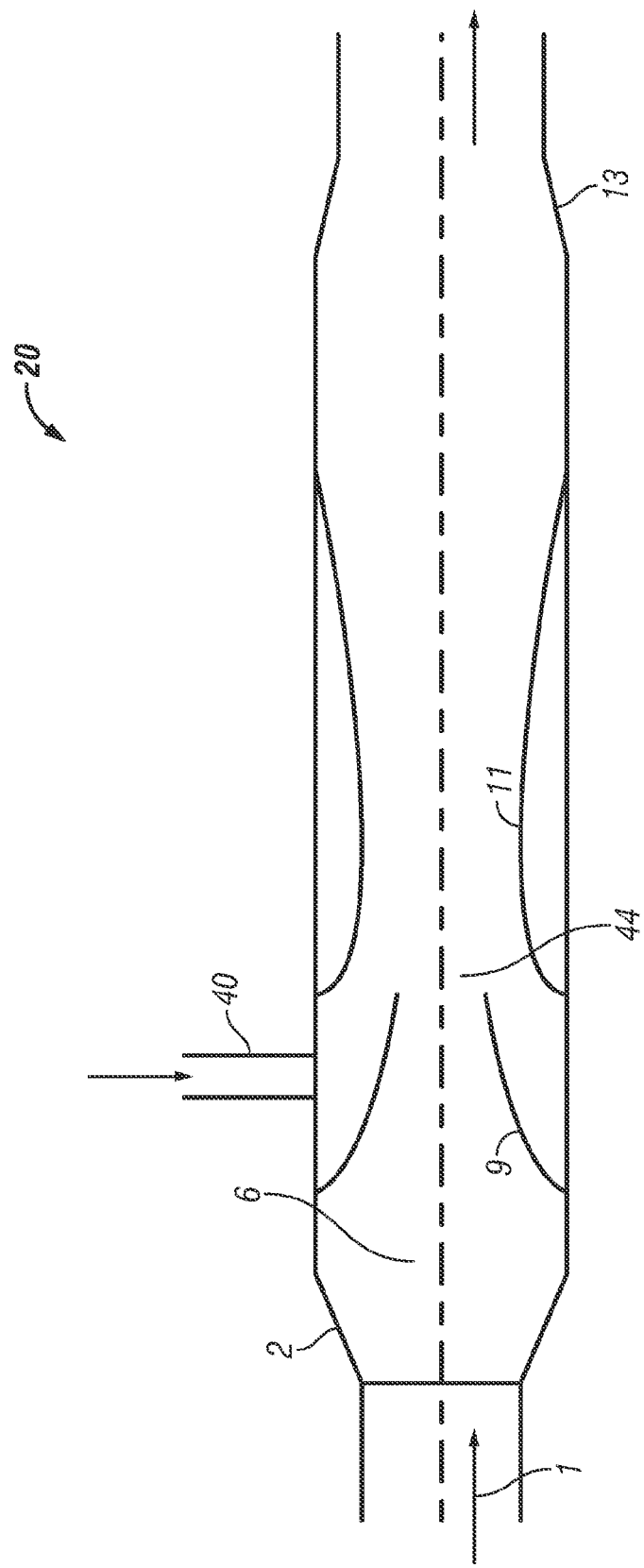

FIG. 14 illustrates the FD device 20 performing as gas/liquid mixing apparatus for such as for pasteurization and homogenization. In this embodiment, the liquid 1 is received by the diffuser 2 and passes into the chamber 6. From the chamber 6, the liquid flows into a Laval nozzle 9. A second liquid stream is injected external to the Laval nozzle 9. The liquid flowing from the Laval nozzle 9 mixes with the second liquid stream at exit 44. The combined liquids then flow into a braking nozzle 11. The entrance to the nozzle 11 is substantially co-located with the exit 44. After passing through the nozzle 11, the combined liquid exits via discharge section 13.

Figure 15:
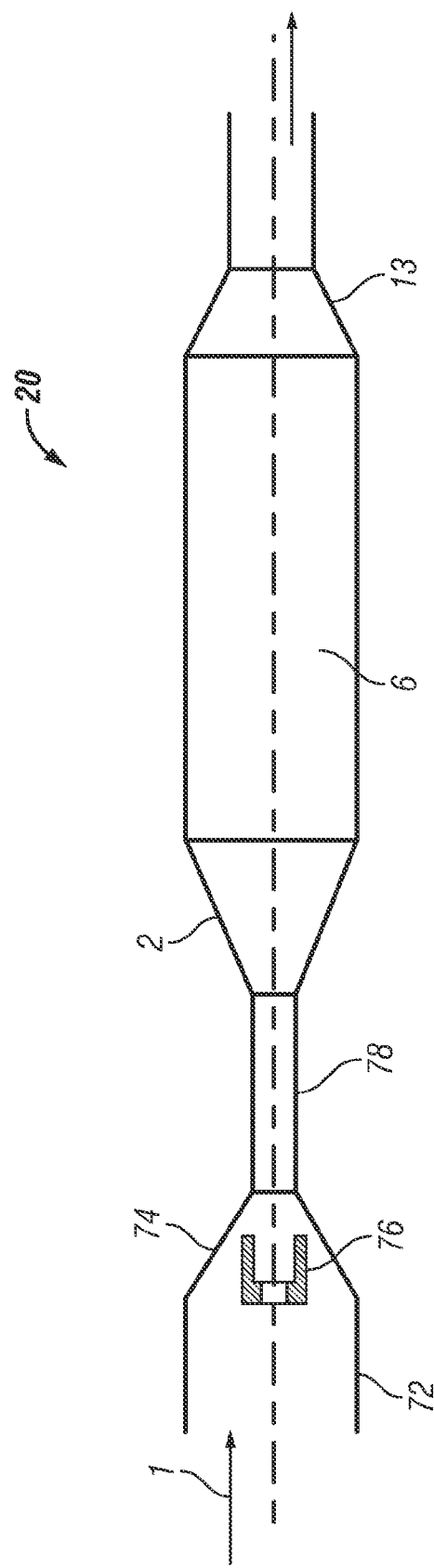

FIG. 15 illustrates the FD device 20 performing as a cavitational heat generation expander. In this embodiment, the liquid 1 enters via a first conduit 72 having a first diameter. The flow of the liquid impacts a cavitation device 76 located in a conical entry section 74. The liquid then flows into a second conduit 78 having a second diameter and a predetermined length. The diameter of the second conduit 78 is smaller than that of the first conduit 72. After passing through the second conduit 78, the liquid enters the chamber 6 via the diffuser 2. The chamber 6 has a predetermined length and terminates in discharge section 13.

Figure 16:
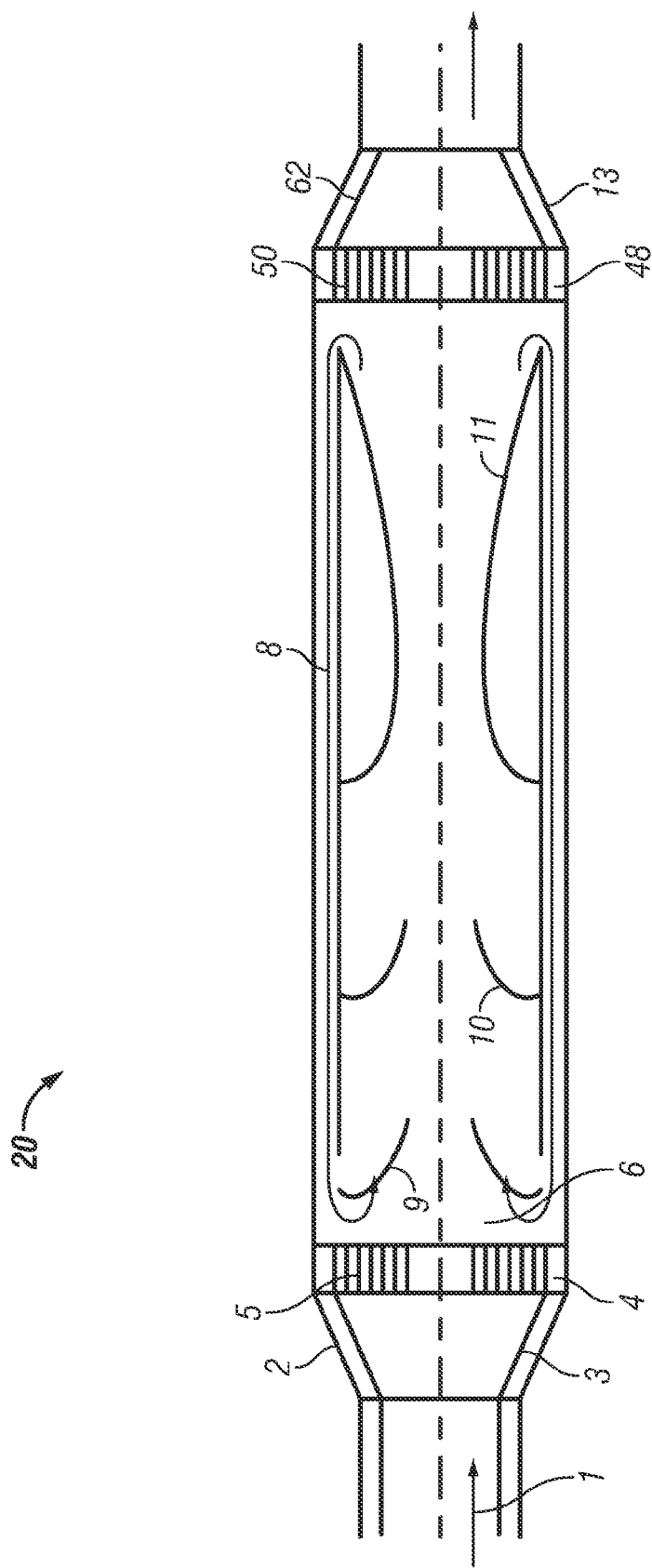

FIG. 16 illustrates the FD device 20 performing as thermal energy harvester and amplifier. In this embodiment, the liquid 1 passes through the diffuser 2 and is directed by ribs 3 into a ring 4 having multiple tubes 5. The liquid passes through the tubes 5 into chamber 6 where it is mixed with a recirculated liquid from concentric conduit 8. From chamber 6, the mixed liquid flows into a first Laval nozzle 9. The mixed liquid exits the first Laval nozzle 9 and flows a first predetermined distance before entering a second Laval nozzle 10. The mixed liquid then flows a second predetermined distance before entering a braking nozzle 11. The entrance to the concentric conduit 8 is arranged at the exit of nozzle 11 to cause a recirculation of a portion of the fluid stream. At the exit of the nozzle 11, a ring 48 having a plurality of tubes receives the liquid stream allowing the liquid stream to exit via the discharge section 13. In this embodiment, the discharge section 13 includes ribs 62 that direct the flow.

Figure 17:
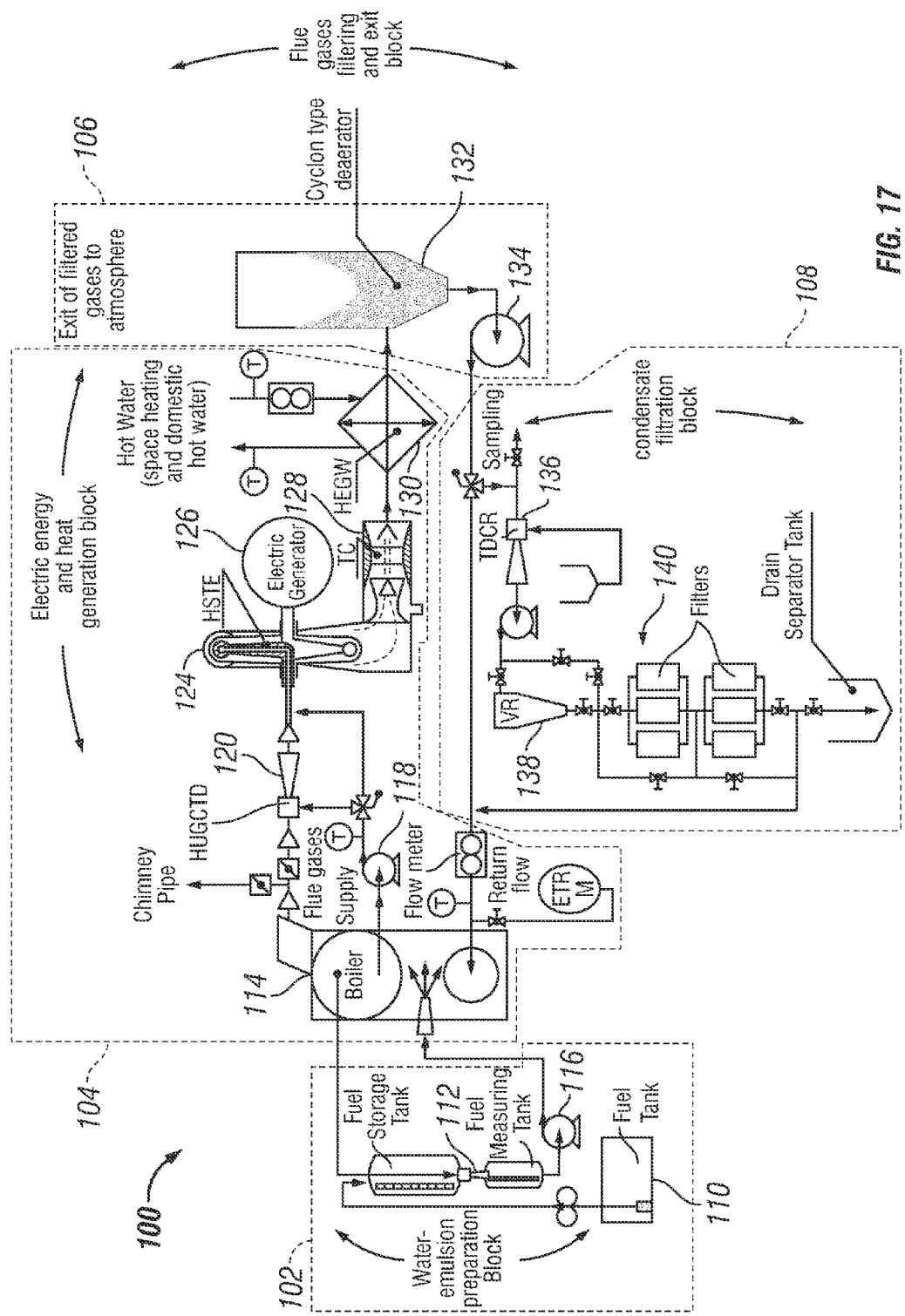
FIG. 17 is a schematic illustration of a combined heat and power system using the Fisonic-type devices of FIGS. 1-16; and, FIG. 18-20 are schematic illustrations of a heat pump system using the Fisonic-type devices of FIGS. 1-16.

Referring now to FIG. 17, an exemplary embodiment of a system 100 using one or more of the FD device 20 embodiments described herein is illustrated. The system 100 is a combined heat and power system that provides both thermal energy and electrical energy to an application such as a manufacturing or commercial office building for example. The system 100 includes a water emulsion preparation section 102, an electrical energy and heat generation section 104, a gas filter section 106 and a condensation section 108.

The water emulsion section 102 combines fuel from a fuel tank 100 is mixed with steam in a transonic emulsification device 112. The emulsified fuel is transferred to a boiler 114 by pump 116. The fuel is burned to create steam. The steam is transferred by a pump 118 into a heat utilization and gas cleaning transonic device 120. The device 120 combines high temperature flue gases from the boiler 114 to create a high pressure high temperature steam mixture at its output 122. The properties of this output 122 are suitable for use in a hydro-steam transonic turbine engine 124. The engine 124 rotates an electrical generator 126 to produce electrical power. It should be appreciated that the conditions of the steam mixture at the outlet of the engine 124 may be greater than Mach 1.

The output 128 of the engine 124 transfers the steam mixture into a transonic condenser 128. Within the condenser 128, the two-phase steam from the engine 124 is accelerated, thereafter mixing of the steam and condensate with the formation of a two-phase mixture of the condensate and steam with the transfer of the flow of the two-phase mixture to the supersonic flow conditions being realized. A change of pressure being realized in a two-phase supersonic flow with the transfer of the two-phase flow during the change of pressure by collapsing of steam bubbles and by an intensive steam condensation, into the single-phase liquid subsonic flow. The condensate is heated at the same time by an intensive steam condensation in the condensate and by the collapsing of steam bubbles during the change of pressure to form a single-phase high temperature liquid. In one embodiment, the liquid is additionally heated within the condenser 128 by the addition of a deceleration stage.

This single-phase high temperature subsonic liquid flows into a heat exchanger 130 having gas/water capacity. The heat exchanger transfers thermal energy from the single-phase liquid to a heat transfer medium, such as water. This heat transfer medium may then be used for space heating, domestic hot water or process heat for example. From the heat exchanger, the cooled single-phase liquid is transferred to a deaerator 132, such as a cyclone type deaerator for example, that separates entrained air and gases from the liquid. The separated gases are filtered and vented to atmosphere.

The liquid is removed from deaerator 132 and transferred via pump 134 to condensate section 108. In condensate section 108, the liquid flows through a transonic chemical reactor device 136 and into a vortex reactor 138. The condensed liquid may be filtered using a manifolded filter arrangement 140 before being transferred back to the boiler 114 for reuse.

Figure 18:
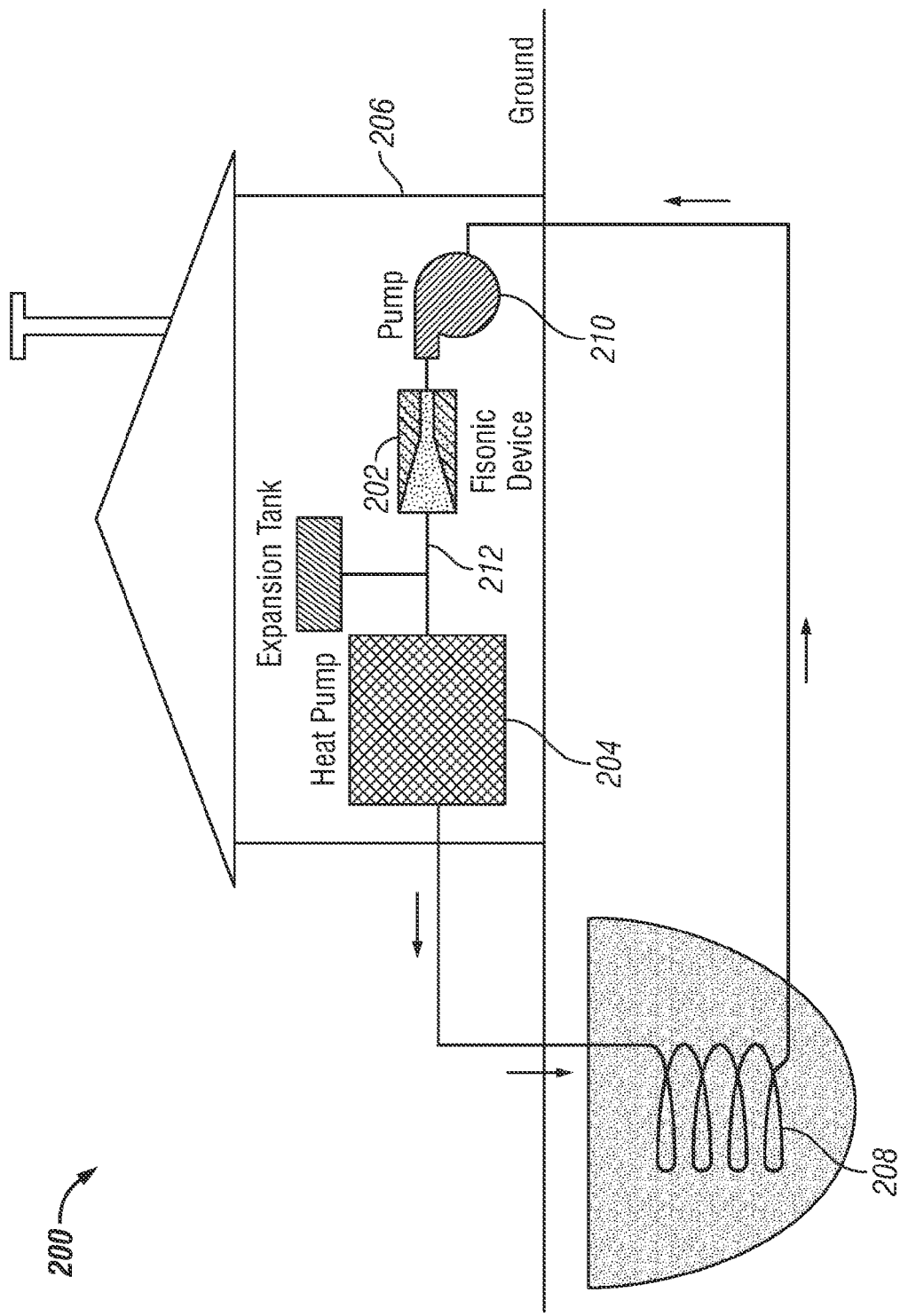
Figure 19:
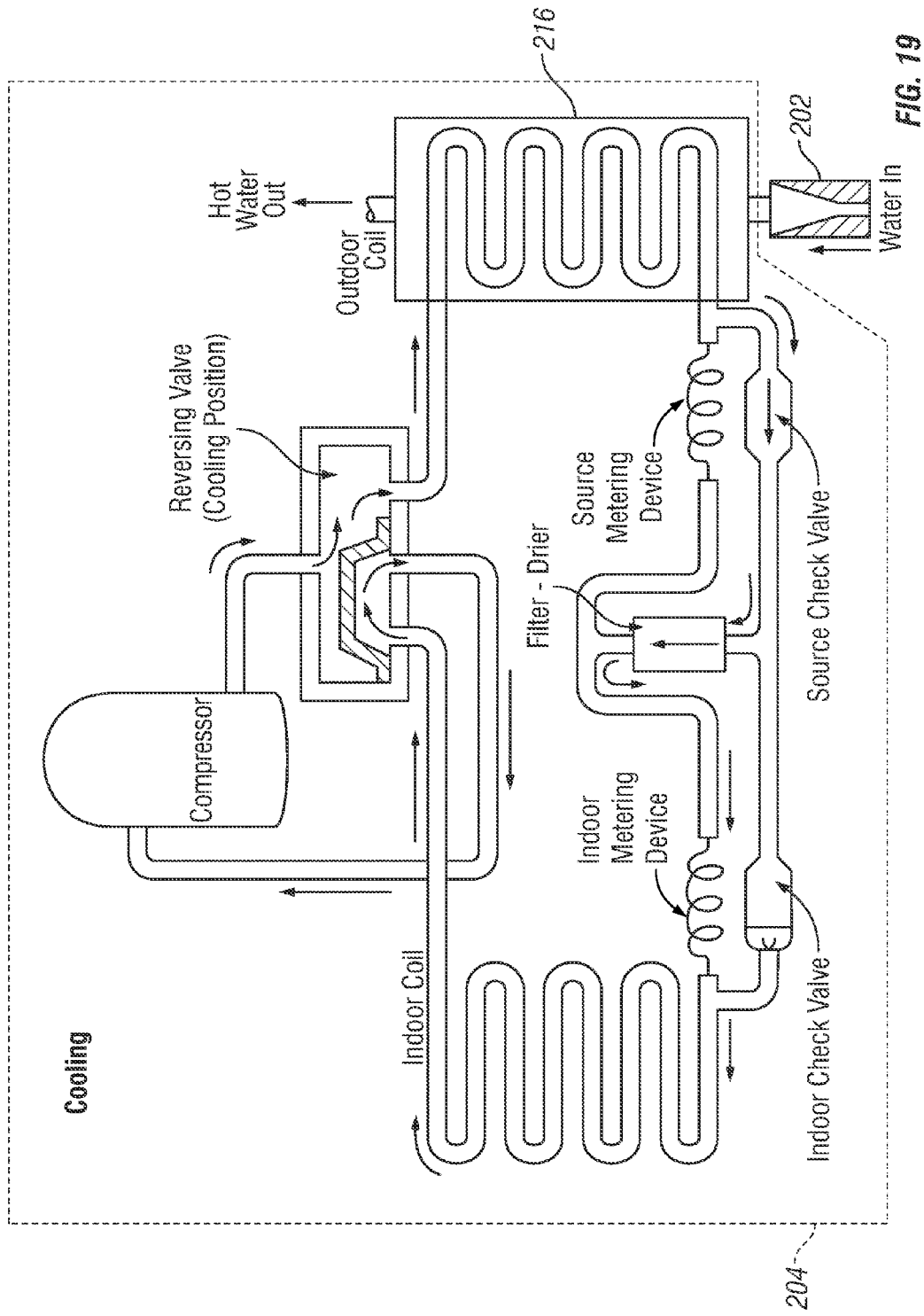

Referring now to FIGS. 18-20, an exemplary embodiment of a system 200 using a FD device 202 with a heat pump 204, such as for heating a residence 206 for example, is illustrated. In the exemplary embodiment, the system 200 is coupled to a geothermal closed-loop surface water system 208. It should be appreciated that while the embodiment herein refers to a geothermal system, the claimed invention should not be so limited. The system includes a geothermal portion 208 that receives a heat transfer medium or coolant from the heat pump 204. The coolant exits the geothermal portion 208 and is transferred via a pump 210 into FD device 202. The temperature and pressure of the coolant is increased with the FD device 202 as described herein above. The coolant exits the FD device 202 into a conduit 212. An expansion tank 214 is coupled to conduit 212. The coolant enters the heat pump 204. When in a cooling mode of operation (FIG. 19), the heat pump 204 transfers heat to the coolant via a heat exchanger 216. The coolant is then transferred to geothermal portion 208 where the thermal energy is transferred to the ground. When in heating mode of operation (FIG. 20), the coolant transfers heat to the heat pump 204 via the heat exchanger 216. The cooled coolant is then transferred to the geothermal portion 208 where coolant is heated by the ground.

According to another embodiment of the invention, an FD apparatus is provided that is coupled to one or more heat generation devices. A first device is provided having multiple inputs, the multiple inputs includes a first input and a second input being fluidly coupled to the heat generation devices. A variable speed first pump is fluidly coupled to supply fluids from the heat generation devices to the first device. A deaerator fluidly coupled to receive the fluids from the first device. In one embodiment, the apparatus includes a second pump fluidly coupled to the first device. A second device fluidly coupled to an inlet of the second pump. A third device is fluidly coupled to an output of the second pump. The FD device improves the flow of the fluid into the pump impeller whereby electrical consumption is reduced and fluid volume is increased.

According to another embodiment of the invention, an FD device is provided that includes a diffuser fluidly coupled to the first input. The diffuser has directing ribs, wherein the pump flows the liquid into the diffuser wherein the diffuser is connected to a ring having multiple tubes with helical ribs on inside surface. The ribs generatea swirl flow resulting in a centrifugal action which provides turbulization of the liquid, wherein the first device includes an open chambers adjacent the rings. The multiple inputs are arranged to inject additional liquid recirculating streams in a concentric external pipe from a discharge portion of the first device.

According to another embodiment of the invention, an FD device is provided where the mixed flow after the open chamber is further discharged into the coaxial nozzle located at the entrance at the Laval nozzle. The single phase liquid is compressed in the Laval nozzle. The pressure of the single phase liquid flow after the Laval nozzle is reduced to a value not higher than the saturation vapor pressure corresponding to the liquid temperature to form multiple vapor bubbles are formed within the liquid. The device includes a braking nozzle adjacent the Laval nozzle. The braking nozzle being configured to create a braking effect on two-phase flow and create counter pressure which causes emergence of a pressure surge with avalanche collapsing therein of a vapor component of two-phase flow and conversion of two-phase flow into single phase flow, wherein during the pressure surge, a range of oscillations is generated fostering collapsing of microscopic vapor bubbles, which increase in the temperature of the liquid and a thrust of the liquid.

According to another embodiment of the invention, an FD device is provided where a portion of the liquid is separated downstream from the braking nozzle and recirculated back to an entrance to the chamber. A main discharge liquid stream moves a predetermined distance and afterwards enters into a ring/screen section whereby a temperature of the liquid is further increased, and wherein the main discharge liquid stream moves some predetermined distance and afterwards enters into a conical discharge section. In one embodiment, the Laval nozzle includes pressure sensors connected to an outside liquid flow metering device.

According to another embodiment of the invention, an FD device is provided wherea distance between an exit of the Laval nozzle and the discharge section is of predetermined dimension. An entrance of the Laval nozzle is equipped with perforation holes. A portion of the fluids discharged from the discharge section is pumped back into a hydro turbine pump which provides flow entering the a pumping device. In one embodiment, the first device further includes additional nozzles for supply of additional liquids and gases for mixing with the main liquid stream and creation of homogeneous mixtures and emulsions. In another embodiment, a flash separator is fluidly coupled to the discharge flow, and wherein the first device is configured in a shape of a 360 degree ring torus.

According to another embodiment of the invention, a method of operation of a FD device is provided. The method includes feeding at least one liquid heat carrier under pressure into a nozzle, the feeding of a cold liquid heat carrier and the mixing the liquid heat carrier and the cold liquid heat carrier. Wherein one of two conversions is carried out with the liquid flow of the liquid heat carrier mixture. A first conversion including an acceleration of the heat carrier mixture to a velocity at which the heat carrier mixture or at least one of the heat carriers of the mixture boils with the formation of a two-phase flow with the transfer of the latter to conditions with a Mach number of more than 1, and then a change of pressure with the transfer in the latter of the two-phase flow to a subsonic liquid flow of the heat carrier mixture and heating the liquid flow of the heat carrier mixture during the change of pressure being performed. A second conversion including the acceleration of the liquid flow of the heat carrier mixture to a velocity at which the heat carrier mixture or at least one of the heat carriers of the mixture boils with the formation of the two-phase flow with the transfer of the latter to the conditions with a Mach number equal to 1, then the two-phase flow being decelerated, and thereby the flow being converted into the liquid flow of the heat carrier mixture with vapour-gas bubbles, and additionally, by this flow conversion, the liquid flow of the heat carrier mixture being heated; thereafter carrying out the two above-mentioned conversions of the liquid flow of the heat carrier mixture in any sequence, the heated liquid flow of the heat carrier mixture being fed under the pressure obtained in the jet apparatus to a consumer.

According to another embodiment of the invention, the FD device may be used for emulsification, homogenization, heating, pumping and improving its rheological properties, preventing formation of space volume structures at temperatures below paraffin's crystallization point, and that of various hydrocarbons as well. This application also allows destroying the asphalt/paraffin intermolecular bonds causing anomalous viscosity. The FD device also decreases the concentration of high molecular compounds, primarily asphaltenes which are centers of supramolecular aggregates.

According to another embodiment of the invention, the FD device may be used for gas/hydrocarbon enhanced oil recovery (EOR), increase of gas/oil production, increase of liquid and gas separation and production, with simultaneous heating, breaking up the oil particles, encapsulating water with a layer of oil, and preventing concentration of water packet pools that cause rupture of oil pipe lines. The application also allows generating strong cavitation shock waves and pressures to drive the sludge oil pockets to be pumped or vacuum the oil/gas from the well. The application also allows break-up of paraffin wax and heavy crude oil formation.

According to another embodiment of the invention, the FD device may be used for enhancing cellulosic and algae based biofuel production and production of other organically based products by micro-pulverization caused by controlled internal shockwaves and shear energy generated by the FD for more thorough and energy efficient instantaneous in-line cooking, including activation of starch fermentation at lower temperatures and requiring use of less additives.

According to another embodiment of the invention, the FD device may be used in an application that uses the excess heat in the nuclear reactor cavity to maintain the recirculation of coolant until the reactor temperatures drop to safe levels, and preventing melt-down of the reactor rods. The FD will operate as long as there is a delta T or delta P. The FD has no moving parts and requires no electric power. The FD will use any supply source of water to recirculate the coolant.

According to another embodiment of the invention, a method of operation of a steam district heating system is provided whereby steam is introduced into a steam/water heat exchanger and hot water is pumped throughout user's hydronic system. An FD device replaces conventional heat exchanger and electrically driven pump, saving energy and requirement to quench condensate prior to discharge. FD device used to replace conventional steam/water heater exchanger for domestic hot water supply with a more efficient autonomic water/water hot water supply loop. FD device recovers discharge condensate from steam heated building and utilizes small quantity of steam to upgrade condensate to usable steam to be recycled throughout building heating system. FD device recovers discharge condensate or spent steam slated to be quenched with cold water and disposed as waste, is recycled to buildings for hot water systems or as grey water for multiple usages.

According to another embodiment of the invention, a method of operating heating hot tubs, swimming pools or any large contained bodies of water utilizing an FD device to heat water while destroying any microbial or bacterial elements in the water, thus eliminating requirements for large quantities of anti-bacterial additives like chlorine.

According to another embodiment of the invention, a method of simultaneously pasteurizing and homogenizing milk, dairy products and other liquid or semi-liquid consumables is provided by using a FD device in a single pass-through operation.

According to another embodiment of the invention, a method of enhancing brewery production in wort processing, system maintenance and energy savings through micro-pulverization caused by controlled internal shockwaves and shear energy generated by the FD device for more thorough mixing, energy efficient instantaneous in-line cooking, activation of starch fermentation at lower temperatures, requiring use of less additives and antibacterial action for post-operation system cleansing.

According to another embodiment of the invention, a method of enhancing industrial cleaning, wash-up, decontamination, fire control and pre-process preparation utilizing the high pressure atomization, disinfecting mixing, misting and precise dozation control capability of FD devices.

According to another embodiment of the invention, a method of increasing fuel efficiencies of engines, including diesel and turbine, by utilizing FD devices to improve mixtures, input pressures and ratios of air, fuel, water or additives for enhanced combustion and reduced emissions.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method of operation of a given kinetic energy harvester, comprising:
feeding a first heat carrier under pressure into the given kinetic energy harvester toward a first convergent nozzle; and,
feeding a second heat carrier into the given kinetic energy harvest upstream of and toward a second convergent nozzle, the second heat carrier being colder than the first heat carrier, the second nozzle being downstream of the first nozzle in the given kinetic energy harvester, and mixing the first heat carrier and the second heat carrier in a mixing chamber between the first nozzle and the second nozzle to produce a two-phase mixture;
wherein a conversion is carried out with the two-phase mixture, the conversion including:
in the mixing chamber between the first nozzle and the second nozzle, causing a pressure drop and deceleration of the two-phase mixture to a velocity at which the two-phase mixture or at least one of the first heat carrier or the second heat carrier boils with formation of the two-phase mixture being highly compressible with small bubbles and with a Mach number of more than 1;
collapsing the small bubbles via the second nozzle to change the two-phase mixture into a single-phase flow medium having increased kinetic thrust downstream of the second nozzle as compared to the two-phase mixture; and
discharging the single-phase flow medium having the increased kinetic thrust from an exit of the given kinetic energy harvester downstream of the second nozzle by discharging the single-phase flow through a converging discharge section at the exit of the given kinetic energy harvester.

2. The method of claim 1, further comprising:
feeding of steam into a turbogenerator;
bleeding the steam from the turbogenerator;
removing the bled steam from the turbogenerator in a condenser;
feeding of condensate from the condenser and the steam bled from the turbogenerator in the kinetic energy harvester with condensation of steam in the kinetic energy harvester and by heating the condensate using any one of a boiler, district energy, solar, geothermal, wind, biomass, fossil, nuclear, waste, or chemical energy with subsequently feeding the heated condensate as feed water into a deaerator; and then into a boiler-steam generator, wherein the condensate and the steam bled from the turbogenerator are accelerated, thereafter mixing of the steam and condensate with the formation of a two-phase mixture of the condensate and steam with the transfer of the flow of the two-phase mixture to supersonic flow conditions, then a change of pressure being realized in a two-phase supersonic flow with a transfer of the two-phase flow during a change of pressure by collapsing of steam bubbles and by an intensive steam condensation, into a single-phase liquid subsonic flow, the condensate being heated at the same time by an intensive steam condensation in the condensate; and, being additionally heated by collapsing of steam bubbles during the change of pressure; and then the heated liquid, flow of the condensate being sent into the deaerator;

wherein the liquid flow of the condensate is additionally decelerated in the kinetic energy harvester, and thereby the liquid flow of the condensate is additionally heated.

3. The method of claim 2 wherein a multi-step feed of the steam into the kinetic energy harvester by means of successive stepwise bleeding of the steam from several stages of the turbogenerator is realized, and in each step of the kinetic energy harvester the formation of the two-phase mixture of the condensate and steam with the transfer of the flow to the supersonic flow conditions and the realization of the change of pressure in each step with the transfer of the flow into the single-phase liquid one and simultaneously heating the liquid flow of the condensate is realized to provide operation heat of hot tubs, swimming pools or any large contained bodies of water.

4. The method of claim 1 wherein the kinetic energy harvester is used in a turbine, a heat pump, geothermal, solar, a steam district heating system, a steam/water heat exchanger, water/water heat exchanger, with discharge of condensate from a steam heated building or district steam system or for recycling grey water.

5. The method of claim 1 wherein the kinetic energy harvester is used systems for emulsification, homogenization, heating, pumping and improving its rheological properties, preventing formation of space volume structures at temperatures below paraffin's crystallization point, and that of various hydrocarbons, destroying the asphalt/paraffin intermolecular bonds causing anomalous viscosity and for decreasing the concentration of high molecular compounds, primarily asphaltenes which are centers of supramolecular aggregates.

6. The method of claim 1 wherein the kinetic energy harvester is used in a system for gas/hydrocarbon enhanced oil recovery (EOR), increasing gas/oil production, increasing liquid and gas separation and production, with simultaneous heating, breaking up the oil particles, encapsulating water with a layer of oil, preventing concentration of water packet pools that cause rupture of oil pipe lines, generating strong cavitation shock waves and pressures to drive the sludge oil pockets to be pumped or vacuum the oil/gas from the well and breaking-up of paraffin wax and heavy crude oil formation.

7. The method of claim 1 wherein the kinetic energy harvester is used in a system for enhancing cellulosic and algae based biofuel production and production of other organically based products by micro-pulverization caused by controlled internal shockwaves and shear energy generated by the kinetic energy harvester for more thorough and energy efficient instantaneous in-line cooking, including activation of starch fermentation at lower temperatures and requiring use of less additives.

8. The method of claim 1 wherein the kinetic energy harvester is used as a pump with no moving parts or electric motor and in a system for cooling the reactor by using the excess heat in the nuclear reactor cavity to maintain the recirculation of coolant until the reactor temperatures drop to safe levels, preventing melt-down of the reactor rods, and for recirculation of coolant.

9. The method of claim 1 wherein the kinetic energy harvester is used for simultaneously pasteurizing and homogenizing milk, dairy products and other liquid or semi-liquid consumables in a single pass-through operation and ease of maintenance.

10. The method of claim 1 wherein the kinetic energy harvester is used in a system for enhancing brewery production in wort processing, system maintenance and energy savings through micro-pulverization caused by controlled internal shockwaves and shear energy generated by the kinetic energy harvester for more thorough mixing, energy efficient instantaneous in-line cooking, activation of starch fermentation at lower temperatures, requiring use of less additives antibacterial action for post-operation system cleansing, and gasification of liquids and degasification of liquids.

11. The method of claim 1 wherein the kinetic energy harvester is used in a system enhancing industrial cleaning, wash-up, decontamination, fire control and pre-process preparation utilizing the high pressure atomization, disinfecting mixing, misting and precise dozation control capability, and emulsification.

12. The method of claim 1 wherein the kinetic energy harvester is used in a system to provide a desired mixture, input pressure and ratio of air, fuel, water or additives to an engine for enhanced combustion and reduced emissions.

* * * * *